US009069799B2

(12) United States Patent  
Vijayan

(10) Patent No.: US 9,069,799 B2  
(45) Date of Patent: Jun. 30, 2015

(54) RESTORATION OF CENTRALIZED DATA STORAGE MANAGER, SUCH AS DATA STORAGE MANAGER IN A HIERARCHICAL DATA STORAGE SYSTEM

(71) Applicant: CommVault Systems, Inc., Oceanport, NJ (US)

(72) Inventor: Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 95 days.

(21) Appl. No.: 13/727,981

(22) Filed: Dec. 27, 2012

(65) Prior Publication Data

US 2014/0188812 A1 Jul. 3, 2014

(51) Int. Cl.
*G06F 17/30* (2006.01)

(52) U.S. Cl.
CPC .... *G06F 17/30289* (2013.01); *G06F 17/30557* (2013.01)

(58) Field of Classification Search
CPC ................................. G06F 17/30; G06F 17/00
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,164 A | 8/1993 | Pavlidis et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |

(Continued)

FOREIGN PATENT DOCUMENTS

| | | |
|---|---|---|
| EP | 0259912 | 3/1988 |
| EP | 0259912 A1 | 3/1988 |

(Continued)

OTHER PUBLICATIONS

Kaczmarski, Michael, Tricia Jiang, and David A. Pease. "Beyond backup toward storage management." IBM Systems Journal 42, No. 2 (2003): 322-337.*

(Continued)

*Primary Examiner* — Farhan Syed  
(74) *Attorney, Agent, or Firm* — Perkins Coie LLP

(57) ABSTRACT

Systems and methods for restoring a database in an information management system that does not include a secondary copy of the database, are disclosed. The systems and methods may include using metadata stored in non-production storage devices to restore the database. In some implementations the methods are used to consolidate multiple information management systems. In other implementations, the systems and methods are used for reviewing content of archived storage media. Other implementations are disclosed.

16 Claims, 13 Drawing Sheets

(56) References Cited

U.S. PATENT DOCUMENTS

| | | | |
|---|---|---|---|
| 5,333,315 A | 7/1994 | Saether et al. | |
| 5,347,653 A | 9/1994 | Flynn et al. | |
| 5,410,700 A | 4/1995 | Fecteau et al. | |
| 5,412,668 A | 5/1995 | Dewey | |
| 5,448,724 A | 9/1995 | Hayashi | |
| 5,455,926 A | 10/1995 | Keele et al. | |
| 5,491,810 A | 2/1996 | Allen | |
| 5,495,457 A | 2/1996 | Takagi | |
| 5,495,607 A | 2/1996 | Pisello et al. | |
| 5,499,364 A | 3/1996 | Klein et al. | |
| 5,504,873 A | 4/1996 | Martin et al. | |
| 5,506,986 A | 4/1996 | Healy | |
| 5,544,345 A | 8/1996 | Carpenter et al. | |
| 5,544,347 A | 8/1996 | Yanai et al. | |
| 5,548,521 A | 8/1996 | Krayer et al. | |
| 5,559,957 A | 9/1996 | Balk | |
| 5,608,865 A | 3/1997 | Midgely et al. | |
| 5,619,644 A | 4/1997 | Crockett et al. | |
| 5,638,509 A | 6/1997 | Dunphy et al. | |
| 5,673,381 A | 9/1997 | Huai et al. | |
| 5,677,900 A | 10/1997 | Nishida et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,815,662 A | 9/1998 | Ong | |
| 5,832,522 A | 11/1998 | Blickenstaff et al. | |
| 5,860,068 A | 1/1999 | Cook | |
| 5,875,478 A | 2/1999 | Blumenau | |
| 5,875,481 A | 2/1999 | Ashton et al. | |
| 5,887,134 A | 3/1999 | Ebrahim | |
| 5,893,139 A | 4/1999 | Kamiyama et al. | |
| 5,898,593 A | 4/1999 | Baca et al. | |
| 5,901,327 A | 5/1999 | Ofek | |
| 5,924,102 A | 7/1999 | Perks | |
| 5,950,205 A | 9/1999 | Aviani, Jr. | |
| 5,958,005 A | 9/1999 | Thorne et al. | |
| 5,974,563 A | 10/1999 | Beeler, Jr. | |
| 5,978,577 A | 11/1999 | Rierden et al. | |
| 6,021,415 A | 2/2000 | Cannon et al. | |
| 6,023,705 A | 2/2000 | Bellinger et al. | |
| 6,026,398 A | 2/2000 | Brown et al. | |
| 6,026,414 A | 2/2000 | Anglin | |
| 6,052,735 A | 4/2000 | Ulrich et al. | |
| 6,076,148 A | 6/2000 | Kedem | |
| 6,088,694 A | 7/2000 | Burns et al. | |
| 6,094,416 A | 7/2000 | Ying | |
| 6,131,095 A | 10/2000 | Low et al. | |
| 6,131,099 A | 10/2000 | Johnson et al. | |
| 6,131,147 A | 10/2000 | Takagi | |
| 6,131,190 A | 10/2000 | Sidwell | |
| 6,137,864 A | 10/2000 | Yaker | |
| 6,148,412 A | 11/2000 | Cannon et al. | |
| 6,154,738 A | 11/2000 | Call | |
| 6,154,787 A | 11/2000 | Urevig et al. | |
| 6,161,111 A | 12/2000 | Mutalik et al. | |
| 6,167,402 A | 12/2000 | Yeager | |
| 6,195,794 B1 | 2/2001 | Buxton | |
| 6,212,512 B1 | 4/2001 | Barney et al. | |
| 6,223,205 B1 | 4/2001 | Harchol-Balter et al. | |
| 6,246,882 B1 | 6/2001 | Lachance | |
| 6,260,069 B1 | 7/2001 | Anglin | |
| 6,266,784 B1 | 7/2001 | Hsiao et al. | |
| 6,269,382 B1 | 7/2001 | Cabrera et al. | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,304,880 B1 | 10/2001 | Kishi | |
| 6,308,245 B1 | 10/2001 | Johnson et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,572 B1 | 12/2001 | Sitka | |
| 6,330,642 B1 | 12/2001 | Carteau | |
| 6,338,006 B1 | 1/2002 | Jesionowski et al. | |
| 6,343,324 B1 | 1/2002 | Hubis et al. | |
| RE37,601 E | 3/2002 | Eastridge et al. | |
| 6,353,878 B1 | 3/2002 | Dunham | |
| 6,356,801 B1 | 3/2002 | Goodman et al. | |
| 6,356,901 B1 | 3/2002 | MacLeod et al. | |
| 6,366,900 B1 | 4/2002 | Hu | |
| 6,374,336 B1 | 4/2002 | Peters et al. | |
| 6,389,432 B1 | 5/2002 | Pothapragada et al. | |
| 6,418,441 B1 | 7/2002 | Call | |
| 6,418,478 B1 | 7/2002 | Ignatius et al. | |
| 6,421,711 B1 | 7/2002 | Blumenau et al. | |
| 6,434,682 B1 | 8/2002 | Ashton et al. | |
| 6,457,017 B2 | 9/2002 | Watkins et al. | |
| 6,484,166 B1 | 11/2002 | Maynard | |
| 6,487,561 B1 | 11/2002 | Ofek et al. | |
| 6,490,666 B1 | 12/2002 | Cabrera et al. | |
| 6,496,744 B1 | 12/2002 | Cook | |
| 6,519,679 B2 | 2/2003 | Devireddy et al. | |
| 6,538,669 B1 | 3/2003 | Lagueux, Jr. et al. | |
| 6,542,972 B2 | 4/2003 | Ignatius et al. | |
| 6,550,057 B1 * | 4/2003 | Bowman-Amuah | 717/126 |
| 6,564,228 B1 | 5/2003 | O'Connor | |
| 6,615,349 B1 | 9/2003 | Hair | |
| 6,616,047 B2 | 9/2003 | Catan | |
| 6,658,436 B2 | 12/2003 | Oshinsky et al. | |
| 6,658,526 B2 | 12/2003 | Nguyen et al. | |
| 6,662,281 B2 | 12/2003 | Ballard et al. | |
| 6,669,832 B1 | 12/2003 | Saito et al. | |
| 6,674,924 B2 | 1/2004 | Wright et al. | |
| 6,704,839 B2 | 3/2004 | Butterworth et al. | |
| 6,721,334 B1 | 4/2004 | Ketcham | |
| 6,732,293 B1 | 5/2004 | Schneider | |
| 6,757,794 B2 | 6/2004 | Cabrera et al. | |
| 6,771,595 B1 | 8/2004 | Gilbert et al. | |
| 6,785,078 B2 | 8/2004 | Basham et al. | |
| 6,789,161 B1 | 9/2004 | Blendermann et al. | |
| 6,802,025 B1 | 10/2004 | Thomas et al. | |
| 6,820,035 B1 | 11/2004 | Zahavi | |
| 6,851,031 B2 | 2/2005 | Trimmer et al. | |
| 6,862,622 B2 | 3/2005 | Jorgensen | |
| 6,909,356 B2 | 6/2005 | Brown et al. | |
| 6,922,687 B2 | 7/2005 | Vernon | |
| 6,934,879 B2 | 8/2005 | Misra et al. | |
| 6,941,370 B2 | 9/2005 | Boies et al. | |
| 6,950,723 B2 | 9/2005 | Gallo et al. | |
| 6,968,351 B2 | 11/2005 | Butterworth | |
| 6,968,479 B2 | 11/2005 | Wyatt et al. | |
| 6,972,918 B2 | 12/2005 | Kokami et al. | |
| 6,973,369 B2 | 12/2005 | Trimmer et al. | |
| 6,973,553 B1 | 12/2005 | Archibald, Jr. et al. | |
| 6,983,351 B2 | 1/2006 | Gibble et al. | |
| 7,006,435 B1 | 2/2006 | Davies et al. | |
| 7,010,387 B2 | 3/2006 | Lantry et al. | |
| 7,012,529 B2 | 3/2006 | Sajkowsky | |
| 7,034,683 B2 | 4/2006 | Ghazarian | |
| 7,035,880 B2 | 4/2006 | Crescenti et al. | |
| 7,058,649 B2 | 6/2006 | Ough et al. | |
| 7,069,466 B2 | 6/2006 | Trimmer et al. | |
| 7,082,441 B1 | 7/2006 | Zahavi et al. | |
| 7,085,786 B2 | 8/2006 | Carlson et al. | |
| 7,085,904 B2 | 8/2006 | Mizuno et al. | |
| 7,093,089 B2 | 8/2006 | de Brebisson | |
| 7,096,269 B2 | 8/2006 | Yamagami | |
| 7,096,315 B2 | 8/2006 | Takeda et al. | |
| 7,103,619 B1 | 9/2006 | Rajpurkar et al. | |
| 7,103,731 B2 | 9/2006 | Gibble et al. | |
| 7,103,740 B1 | 9/2006 | Colgrove et al. | |
| 7,107,298 B2 | 9/2006 | Prahlad et al. | |
| 7,107,395 B1 | 9/2006 | Ofek et al. | |
| 7,118,034 B2 | 10/2006 | Baldassari et al. | |
| 7,120,823 B2 | 10/2006 | Foster et al. | |
| 7,130,970 B2 | 10/2006 | Devassy et al. | |
| 7,136,720 B2 | 11/2006 | Deckers | |

(56) References Cited

U.S. PATENT DOCUMENTS

| | | |
|---|---|---|
| 7,146,377 B2 | 12/2006 | Nowicki et al. |
| 7,155,465 B2 | 12/2006 | Lee et al. |
| 7,155,486 B2 | 12/2006 | Aoshima et al. |
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | van Rietschote et al. |
| 7,209,949 B2 | 4/2007 | Mousseau et al. |
| 7,213,118 B2 | 5/2007 | Goodman et al. |
| 7,216,244 B2 | 5/2007 | Amano |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,251,218 B2 | 7/2007 | Jorgensen |
| 7,275,063 B2 | 9/2007 | Horn |
| 7,277,246 B2 | 10/2007 | Barbian et al. |
| 7,277,953 B2 | 10/2007 | Wils et al. |
| 7,281,032 B2 | 10/2007 | Kodama |
| 7,287,047 B2 | 10/2007 | Kavuri |
| 7,293,133 B1 | 11/2007 | Colgrove et al. |
| 7,302,540 B1 | 11/2007 | Holdman et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,379,850 B2 | 5/2008 | Sprogis et al. |
| 7,395,282 B1 | 7/2008 | Crescenti et al. |
| 7,395,387 B2 | 7/2008 | Berkowitz et al. |
| 7,401,728 B2 | 7/2008 | Markham et al. |
| 7,412,433 B2 | 8/2008 | Anglin et al. |
| 7,418,464 B2 | 8/2008 | Cannon et al. |
| 7,421,312 B2 | 9/2008 | Trossell |
| 7,434,090 B2 | 10/2008 | Hartung et al. |
| 7,447,907 B2 | 11/2008 | Hart, III et al. |
| 7,451,283 B2 | 11/2008 | Chen et al. |
| 7,454,569 B2 | 11/2008 | Kavuri et al. |
| 7,467,167 B2 | 12/2008 | Patterson |
| 7,472,238 B1 | 12/2008 | Gokhale et al. |
| 7,500,053 B1 | 3/2009 | Kavuri et al. |
| 7,529,782 B2 | 5/2009 | Prahlad et al. |
| 7,536,424 B2 | 5/2009 | Barzilai et al. |
| 7,539,702 B2 | 5/2009 | Deshmukh et al. |
| 7,539,783 B2 | 5/2009 | Kochunni et al. |
| 7,565,340 B2 | 7/2009 | Herlocker et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,617,392 B2 | 11/2009 | Hair |
| 7,627,617 B2 | 12/2009 | Kavuri et al. |
| 7,644,245 B2 | 1/2010 | Prahlad et al. |
| 7,653,671 B2 | 1/2010 | Ikezawa et al. |
| 7,657,666 B2 | 2/2010 | Kottomtharayil et al. |
| 7,659,820 B2 | 2/2010 | Schnee et al. |
| 7,660,812 B2 | 2/2010 | Findlay et al. |
| 7,680,843 B1 | 3/2010 | Panchbudhe et al. |
| 7,689,510 B2 | 3/2010 | Lamkin et al. |
| 7,702,659 B2 | 4/2010 | Ban et al. |
| 7,702,831 B2 | 4/2010 | Ma et al. |
| 7,707,060 B2 | 4/2010 | Chainer et al. |
| 7,712,094 B2 | 5/2010 | Shapiro |
| 7,720,817 B2 | 5/2010 | Stager et al. |
| 7,739,450 B2 | 6/2010 | Kottomtharayil |
| 7,748,610 B2 | 7/2010 | Bell et al. |
| 7,765,167 B2 | 7/2010 | Prahlad et al. |
| 7,765,369 B1 | 7/2010 | Prahlad et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,822,715 B2 | 10/2010 | Petruzzo |
| 7,831,566 B2 | 11/2010 | Kavuri et al. |
| 7,840,537 B2 | 11/2010 | Gokhale et al. |
| 7,844,573 B2 | 11/2010 | Amarendran et al. |
| 7,849,266 B2 | 12/2010 | Kavuri et al. |
| 7,861,011 B2 | 12/2010 | Kottomtharayil et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,889,847 B2 | 2/2011 | Gainsboro |
| 7,890,796 B2 | 2/2011 | Pawar et al. |
| 7,904,350 B2 | 3/2011 | Ayala et al. |
| 7,917,473 B2 | 3/2011 | Kavuri et al. |
| 7,917,695 B2 | 3/2011 | Ulrich et al. |
| 7,934,071 B2 | 4/2011 | Abe et al. |
| 7,937,365 B2 | 5/2011 | Prahlad et al. |
| 7,937,393 B2 | 5/2011 | Prahlad et al. |
| 7,945,810 B2 | 5/2011 | Soran et al. |
| 7,953,802 B2 | 5/2011 | Mousseau et al. |
| 7,966,293 B1 * | 6/2011 | Owara et al. ................... 707/654 |
| 7,969,306 B2 | 6/2011 | Ebert et al. |
| 7,975,061 B1 | 7/2011 | Gokhale et al. |
| 7,987,319 B2 | 7/2011 | Kottomtharayil |
| 8,005,913 B1 | 8/2011 | Carlander |
| 8,032,569 B2 | 10/2011 | Oshita et al. |
| 8,051,043 B2 | 11/2011 | Young |
| 8,112,605 B2 | 2/2012 | Kavuri |
| 8,140,786 B2 | 3/2012 | Bunte et al. |
| 8,161,318 B2 | 4/2012 | D'Souza et al. |
| 8,195,800 B2 | 6/2012 | Tameshige et al. |
| 8,209,293 B2 | 6/2012 | Gokhale et al. |
| 8,219,524 B2 | 7/2012 | Gokhale |
| 8,230,066 B2 | 7/2012 | Heil |
| 8,230,171 B2 | 7/2012 | Kottomtharayil |
| 8,234,417 B2 | 7/2012 | Kottomtharayil et al. |
| 8,244,841 B2 | 8/2012 | Shaji et al. |
| 8,266,406 B2 | 9/2012 | Kavuri |
| 8,266,615 B2 | 9/2012 | Shapiro |
| 8,285,681 B2 * | 10/2012 | Prahlad et al. ................ 707/640 |
| 8,306,926 B2 | 11/2012 | Prahlad et al. |
| 8,346,733 B2 | 1/2013 | Gokhale et al. |
| 8,346,734 B2 | 1/2013 | Muller et al. |
| 8,402,000 B2 | 3/2013 | Gokhale et al. |
| 8,407,190 B2 * | 3/2013 | Prahlad et al. ................ 707/692 |
| 8,463,753 B2 | 6/2013 | Gokhale et al. |
| 8,463,994 B2 | 6/2013 | Kottomtharayil |
| 8,484,165 B2 | 7/2013 | Gokhale et al. |
| 8,600,998 B1 * | 12/2013 | Chaudhary et al. ........... 707/741 |
| 8,620,286 B2 * | 12/2013 | Stannard et al. ........... 455/414.2 |
| 8,635,204 B1 * | 1/2014 | Xie et al. ...................... 707/709 |
| 8,661,216 B2 | 2/2014 | Kavuri et al. |
| 8,688,641 B1 * | 4/2014 | Cook et al. .................... 707/638 |
| 8,700,578 B1 * | 4/2014 | Varadan et al. ............... 707/692 |
| 8,712,959 B1 * | 4/2014 | Lim et al. ...................... 707/633 |
| 8,832,044 B1 * | 9/2014 | Gipp et al. .................... 707/693 |
| 8,849,761 B2 * | 9/2014 | Prahlad et al. ................ 707/640 |
| 8,931,107 B1 * | 1/2015 | Brandwine .................... 726/26 |
| 2002/0010661 A1 | 1/2002 | Waddington et al. |
| 2002/0032613 A1 | 3/2002 | Buettgenbach et al. |
| 2002/0049778 A1 | 4/2002 | Bell et al. |
| 2002/0069324 A1 | 6/2002 | Gerasimov et al. |
| 2002/0087950 A1 | 7/2002 | Brodeur et al. |
| 2003/0055671 A1 | 3/2003 | Nassar |
| 2003/0065759 A1 | 4/2003 | Britt et al. |
| 2003/0101155 A1 | 5/2003 | Gokhale et al. |
| 2003/0134619 A1 | 7/2003 | Phillips et al. |
| 2003/0220901 A1 | 11/2003 | Carr et al. |
| 2004/0054607 A1 | 3/2004 | Waddington et al. |
| 2004/0073677 A1 | 4/2004 | Honma et al. |
| 2004/0083202 A1 | 4/2004 | Mu et al. |
| 2004/0107199 A1 | 6/2004 | Dalrymple et al. |
| 2004/0186847 A1 | 9/2004 | Rappaport et al. |
| 2004/0193953 A1 | 9/2004 | Callahan et al. |
| 2005/0008163 A1 | 1/2005 | Leser et al. |
| 2005/0021524 A1 | 1/2005 | Oliver |
| 2005/0033913 A1 | 2/2005 | Kottomtharayil et al. |
| 2005/0039069 A1 | 2/2005 | Prahlad et al. |
| 2005/0102203 A1 | 5/2005 | Keong |

(56) References Cited

U.S. PATENT DOCUMENTS

| | | | |
|---|---|---|---|
| 2005/0125807 | A1 | 6/2005 | Brady et al. |
| 2005/0174869 | A1 | 8/2005 | Kottomtharayil et al. |
| 2005/0177828 | A1 | 8/2005 | Graham et al. |
| 2005/0246342 | A1 | 11/2005 | Vernon |
| 2006/0004639 | A1 | 1/2006 | O'Keefe |
| 2006/0004675 | A1 | 1/2006 | Bennett et al. |
| 2006/0011720 | A1 | 1/2006 | Call |
| 2006/0095385 | A1 | 5/2006 | Atkinson et al. |
| 2006/0100912 | A1 | 5/2006 | Kumar et al. |
| 2006/0161879 | A1 | 7/2006 | Lubrecht et al. |
| 2006/0169769 | A1 | 8/2006 | Boyarsky et al. |
| 2006/0224846 | A1 | 10/2006 | Amarendran et al. |
| 2006/0248165 | A1 | 11/2006 | Sridhar et al. |
| 2006/0282194 | A1 | 12/2006 | Schaefer et al. |
| 2006/0285172 | A1 | 12/2006 | Hull et al. |
| 2007/0061266 | A1 | 3/2007 | Moore et al. |
| 2007/0130105 | A1 | 6/2007 | Papatla |
| 2007/0150886 | A1* | 6/2007 | Shapiro ............ 717/174 |
| 2007/0156897 | A1 | 7/2007 | Lim |
| 2007/0185912 | A1 | 8/2007 | Gupta et al. |
| 2007/0198722 | A1 | 8/2007 | Kottomtharayil et al. |
| 2008/0243795 | A1 | 10/2008 | Prahlad et al. |
| 2008/0244177 | A1 | 10/2008 | Crescenti et al. |
| 2008/0250076 | A1 | 10/2008 | Muller et al. |
| 2008/0320319 | A1 | 12/2008 | Muller et al. |
| 2009/0063765 | A1 | 3/2009 | Kottomtharayil et al. |
| 2009/0319534 | A1 | 12/2009 | Gokhale |
| 2010/0017528 | A1 | 1/2010 | Awano |
| 2010/0030528 | A1 | 2/2010 | Smith et al. |
| 2010/0070466 | A1 | 3/2010 | Prahlad et al. |
| 2010/0070474 | A1 | 3/2010 | Lad |
| 2010/0070726 | A1 | 3/2010 | Ngo et al. |
| 2010/0082672 | A1 | 4/2010 | Kottomtharayil et al. |
| 2010/0082818 | A1 | 4/2010 | Paul et al. |
| 2010/0138393 | A1 | 6/2010 | Crescenti et al. |
| 2010/0332454 | A1* | 12/2010 | Prahlad et al. ............ 707/654 |
| 2010/0332456 | A1* | 12/2010 | Prahlad et al. ............ 707/664 |
| 2010/0333116 | A1* | 12/2010 | Prahlad et al. ............ 719/328 |
| 2011/0093672 | A1 | 4/2011 | Gokhale et al. |
| 2011/0213755 | A1 | 9/2011 | Kavuri et al. |
| 2011/0218974 | A1* | 9/2011 | Amit et al. ............ 707/693 |
| 2011/0218975 | A1* | 9/2011 | Amit et al. ............ 707/693 |
| 2011/0231852 | A1 | 9/2011 | Gokhale et al. |
| 2011/0270833 | A1* | 11/2011 | Von Kaenel et al. ......... 707/736 |
| 2012/0084523 | A1 | 4/2012 | Littlefield et al. |
| 2012/0185657 | A1 | 7/2012 | Gokhale et al. |
| 2012/0271989 | A1 | 10/2012 | Kottomtharayil et al. |
| 2013/0024424 | A1* | 1/2013 | Prahlad et al. ............ 707/640 |
| 2013/0054533 | A1* | 2/2013 | Hao et al. ............ 707/649 |
| 2013/0238572 | A1* | 9/2013 | Prahlad et al. ............ 707/692 |
| 2013/0318207 | A1* | 11/2013 | Dotter ............ 709/219 |
| 2014/0046900 | A1* | 2/2014 | Kumarasamy et al. ...... 707/620 |
| 2014/0046904 | A1* | 2/2014 | Kumarasamy ............ 707/652 |
| 2014/0122435 | A1* | 5/2014 | Chavda et al. ............ 707/645 |
| 2015/0012495 | A1* | 1/2015 | Prahlad et al. ............ 707/640 |

FOREIGN PATENT DOCUMENTS

| | | |
|---|---|---|
| EP | 0405926 | 1/1991 |
| EP | 0405926 A2 | 1/1991 |
| EP | 0467546 | 1/1992 |
| EP | 0467546 A2 | 1/1992 |
| EP | 0620553 | 10/1994 |
| EP | 0757317 | 2/1997 |
| EP | 0774715 | 5/1997 |
| EP | 0774715 A1 | 5/1997 |
| EP | 0809184 | 11/1997 |
| EP | 0809184 A1 | 11/1997 |
| EP | 0899662 | 3/1999 |
| EP | 0899662 A1 | 3/1999 |
| EP | 0981090 | 2/2000 |
| EP | 0981090 A1 | 2/2000 |
| JP | 7254204 | 10/1995 |
| JP | 9044381 | 2/1997 |
| JP | 9081424 | 3/1997 |
| WO | WO9513580 | 5/1995 |
| WO | WO-9513580 A1 | 5/1995 |
| WO | WO9912098 | 3/1999 |
| WO | WO-9912098 A1 | 3/1999 |
| WO | WO-2005/024573 | 3/2005 |

OTHER PUBLICATIONS

Quinlan, Sean, and Sean Dorward. "Venti: A New Approach to Archival Storage." In FAST, vol. 2, pp. 89-101 (13 total pages), 2002.*
U.S. Appl. No. 09/609,977, filed Jul. 5, 2000, Prahlad.
U.S. Appl. No. 10/655,764, filed Sep. 5, 2003, Nourmohamadian.
U.S. Appl. No. 11/269,513, filed Nov. 7, 2005, Prahlad.
U.S. Appl. No. 13/787,280, filed Mar. 6, 2013, Vibhor et al.
U.S. Appl. No. 13/942,460, filed Jul. 15, 2013, Kottomtharayil et al.
Allen, "Probability, Statistics and Queuing Theory," (1978), p. 370, col. 19, Lines 3-33, 2 pages.
Ashton et al., Two Decades of policy-based storage management for the IBM mainframe computer, www.research.ibm.com, published Apr. 10, 2003, printed Jan. 3, 2009, 19 pages.
Campbell, C.: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006], 6 pages.
Carrington, D.: "Backups Using the "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 22, 2006], 1 page.
CDDB—Wikipedia.
Cook, P.: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&q=%22ntbackup+eject%22+at&rnum=1&hl=de#0ab1d93a6f91b511> [retrieved on Aug. 22, 2006], 1 page.
Gonzalez-Seco, Jose, "A Genetic Algorithm as the Learning Procedure for Neural Networks," International Joint Conference on Neural Networks, Jun. 1992, 356 pages.
MDM: "Automatically eject tape", Internet Publication, [Online] Jun. 7, 1999, Retrieved from Internet: URL: <http://groups.google.de/group/microsoft.public.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006], 1 page.
Savill, J., "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006], 8 pages.
Recycle Bin (Windows), Aug. 2007, Wikipedia, pp. 1-3.
Armstead et al., "Implementation of a Campus-wide Distributed Mass Storage Service: The Dream vs. Reality," IEEE, Sep. 11-14, 1995, pp. 190-199.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, Jun. 12-16, 1994, pp. 124-126.
Gait, J., "The Optical File Cabinet: A Random-Access File System for Write-Once Optical Disks," IEEE Computer, vol. 21, No. 6, pp. 11-22 (Jun. 1988).
Jander, M., "Launching Storage-Area Net," Data Communications, US, McGraw Hill, NY, vol. 27, No. 4 (Mar. 21, 1998), pp. 64-72.
Rosenblum et al., "The Design and Implementation of a Log-Structured File System," Operating Systems Review SIGOPS, vol. 25, No. 5, New York, US, pp. 1-15 (May 1991).

* cited by examiner

RESTORATION OF CENTRALIZED DATA STORAGE MANAGER, SUCH AS DATA STORAGE MANAGER IN A HIERARCHICAL DATA STORAGE SYSTEM

BACKGROUND

Information management systems organize and backup information, i.e., "production data", generated during the operation of client computing systems. Information management systems enable companies, and other computing system users, to comply with legal requirements and other business needs by providing retrievable copies, i.e., "secondary copies", of the production data for each client computing system. Information management systems make various types of secondary copies, such as a backup copy, a snapshot copy, a hierarchical storage management ("HSM") copy, an archive copy, and other types of copies. Each of the types of secondary copies have advantages and weaknesses as compared to each other type of secondary copy, but each type of secondary copy generally enables a company to restore settings or data of a computing system to a particular past point-in-time.

To illustrate, an example company that would use an information management system might be a clothing manufacturer, e.g., of denim jeans, that is based out of San Francisco, Calif. The jeans manufacturer uses hundreds of computers to conduct business operations, i.e., to generate production data. The generated production data includes, among other things, reports generated by accountants, benefits records maintained by human resources ("HR"), spreadsheets predicting the future of fashion trends, communications between internal departments, orders placed with third-party material distributors, records showing compliance with international manufacturing laws, and other business-critical information. The jeans manufacturer would be at a tremendous loss if all production data were lost, so the jeans manufacturer uses an information management system to organize and create secondary copies of production data. Information management systems generally use at least one managing computing device to transfer the non-production copies of production data to non-production storage media, such as magnetic drives, magnetic tapes, optical media, solid-state media, or cloud storage devices. With each transfer to the non-production storage media, the managing computing device keeps record of which client computing device information is stored at which non-production storage media, device or location. The managing computing device may compile the records into a table or other data structure ("managing computing device database") to keep track of where the non-production data for each client computing device is stored. In the case that one or more of the client computing devices experiences a failure, the managing computing device uses its database as a reference to restore lost production data using the non-production data stored at the non-production storage media. However, if the storage manager database suffers from a disaster, e.g., the storage manager hard drive is damaged in an earthquake or flood, the mappings of non-production data of the hundreds of client computing devices to specific locations on non-production storage media may all be lost. Thus, the loss of the managing computing device database may render all of the non-production data effectively unusable because the ability to restore the non-production to a particular one of the hundreds of client computing devices is lost.

Currently, to prevent such catastrophic losses, information management systems use techniques that require a company to make various types of secondary copies of the managing computing device database before the managing computing devices database encounters a disaster. However, creation and management of the secondary copies of portions of the information management system require additional resources and therefore raise complexity and overall cost of the information management system. Some of the current techniques include: maintaining a second managing computing device, and creating a secondary copy of the managing computing device database in the non-production storage media. To maintain a second managing computing device, the information management system causes the second managing computing device to mirror the database of the primary managing computing device. The information management system then brings the second managing computing device online to replace the primary managing computing device if the primary managing computing device encounters a disaster.

As an alternative to maintaining a second managing computing device, the information management system can store a secondary copy of the managing computing device database on non-production storage media or at a different or offsite location. If the managing computing device encounters a disaster, the information management system uses the secondary copy of the managing computing device database to create a replacement managing computing device database.

In practice, the jeans manufacturer would have to install a second managing computing device or configure the information management system to install a secondary copy of the managing computing device database in the non-production storage media because these techniques would enable the jeans manufacturer to preserve its valued data. However, if the jeans manufacturer fails to install a second storage manager or fails to configure the storage manager to store secondary copies of the storage manager database, the jeans manufacturer would, according to currently used techniques, lose access to the non-production data until customized software scripts or other time-intensive software could be written to extract the desired information. Further, even if a secondary copy were maintained, e.g. at an offsite and offline location, it can take an intolerable amount of time to restore a failed managing computing device.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

DETAILED DESCRIPTION

Figure 1:
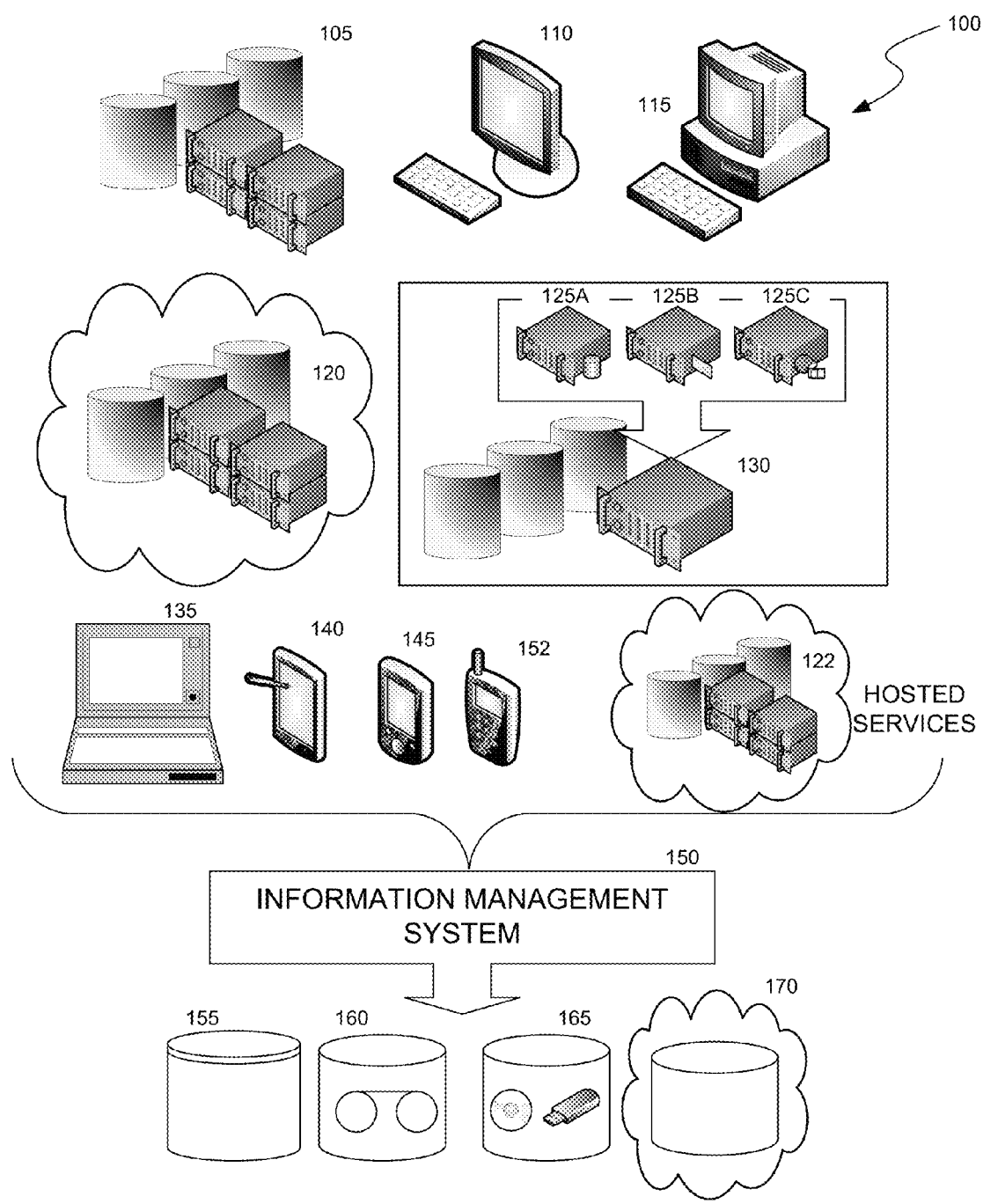
FIG. 1 is a block diagram illustrating an example of suitable information management environment in which aspects of the inventive system may operate.

The techniques disclosed in this document are useful, in one aspect, in solving the above-discussed problems.

The headings provided herein are for convenience only and do not necessarily affect the scope or meaning of the disclosure.

Overview

Disclosed are systems and methods for restoring a storage manager database. If a company, such as the jeans manufacturer in the example above, fails to create secondary copies of portions of its information management system before encountering a storage manager database disaster, the jeans manufacturer loses the ability to restore client computing devices with the non-production data stored in non-production storage media. That is, the jeans manufacturer loses access to its backup data. The jeans manufacturer loses the ability to restore the client computing devices because the mapping, between the client computing devices and the respective non-production data on the non-production storage media, is contained in the storage manager database. The techniques disclosed herein enable the jeans manufacturer to restore a storage manager database in order to regain access to non-production data without having to make secondary copies of the information management system.

Notably, a restore agent may be used to restore databases for other computing devices in an information management cell, rather than simply restoring secondary copies or backup data. In some implementations of the systems and methods for restoring the storage manager database, a replacement storage manager executes the restore agent. The restore agent scans magnetic tapes, or other non-production storage media, and retrieves portions of the content of the magnetic tapes. The content includes headers and other metadata stored on the magnetic tapes. The restore agent restores the damaged or otherwise unusable storage manager database by building a database on the replacement storage manager based on the headers and other metadata retrieved from the magnetic tapes. Notably, the restore agent builds the database by retrieving some, but not necessarily all, of the content of the magnetic tapes. Moreover, the restore agent restores the storage manager database without the information management system having created a secondary copy of the storage manager database prior to the database disaster.

Similar to a storage manager, a media agent may include a database that maps non-production data on the non-production storage media to client computing devices that are directly managed by the media agent. If the database of the media agent is damaged or rendered unusable, the restore agent can be used to restore the database of the media agent.

The restore agent can restore the database of the media agent by retrieving content from non-production storage media or by requesting from the storage manager those portions of the storage manager database that are associated with the media agent.

In other implementations, the replacement storage manager and restore agent consolidate multiple information management cells into a single information management cell. During times of economic prosperity, the jeans manufacturer may have grown its employee base and corresponding information technology (IT) resources to include multiple subsets of an information management system, i.e., information management cells. In an economic downturn, the jeans manufacturer may downsize employees and have reduced IT resource and reduced information management needs. To reduce costs and maintenance, the jeans manufacturer may use the replacement storage manager and restore agent to consolidate multiple information management cells.

In other implementations, the replacement storage manager and restore agent enables a user to access and review magnetic tapes, e.g., from an obsolete or no longer functioning information management system. This implementation advantageously enables a user, for example, a bankruptcy lawyer or trustee, to review boxes of records stored on magnetic tapes for information that may not be available on present systems of the bankrupt company.

FIGS. 1-4 disclose foundational components and elements of an information management system and information management cell. FIGS. 5-12 continue the use of the illustrative jeans manufacturer to describe the various implementations of the systems and methods for restoring a storage manager database, although, of course, any manufacturer or entity may employ the present system.

Various examples of the systems and methods will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010/0332456, which is hereby incorporated herein by reference in its entirety.

Figure 2:
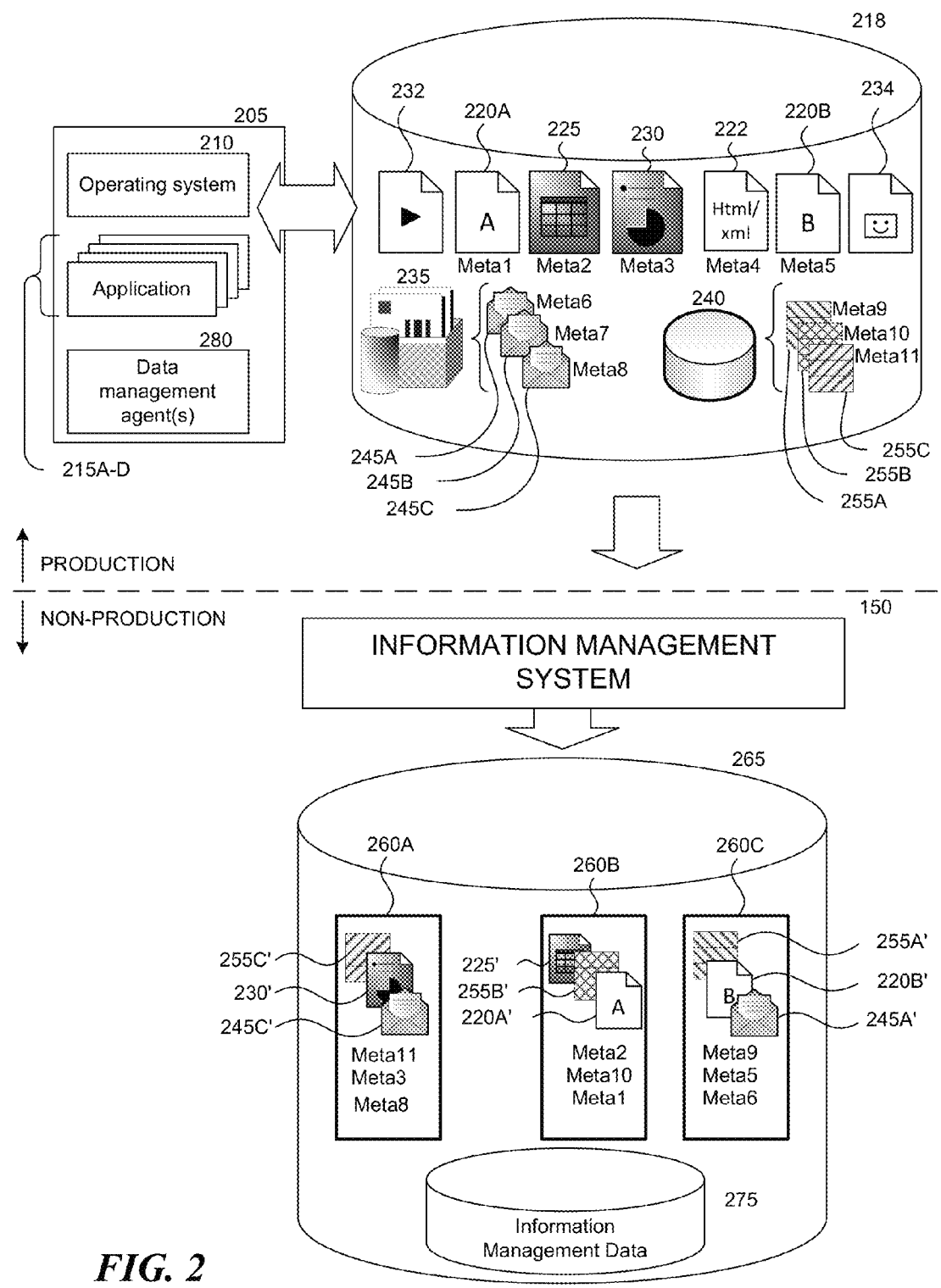
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format).

Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
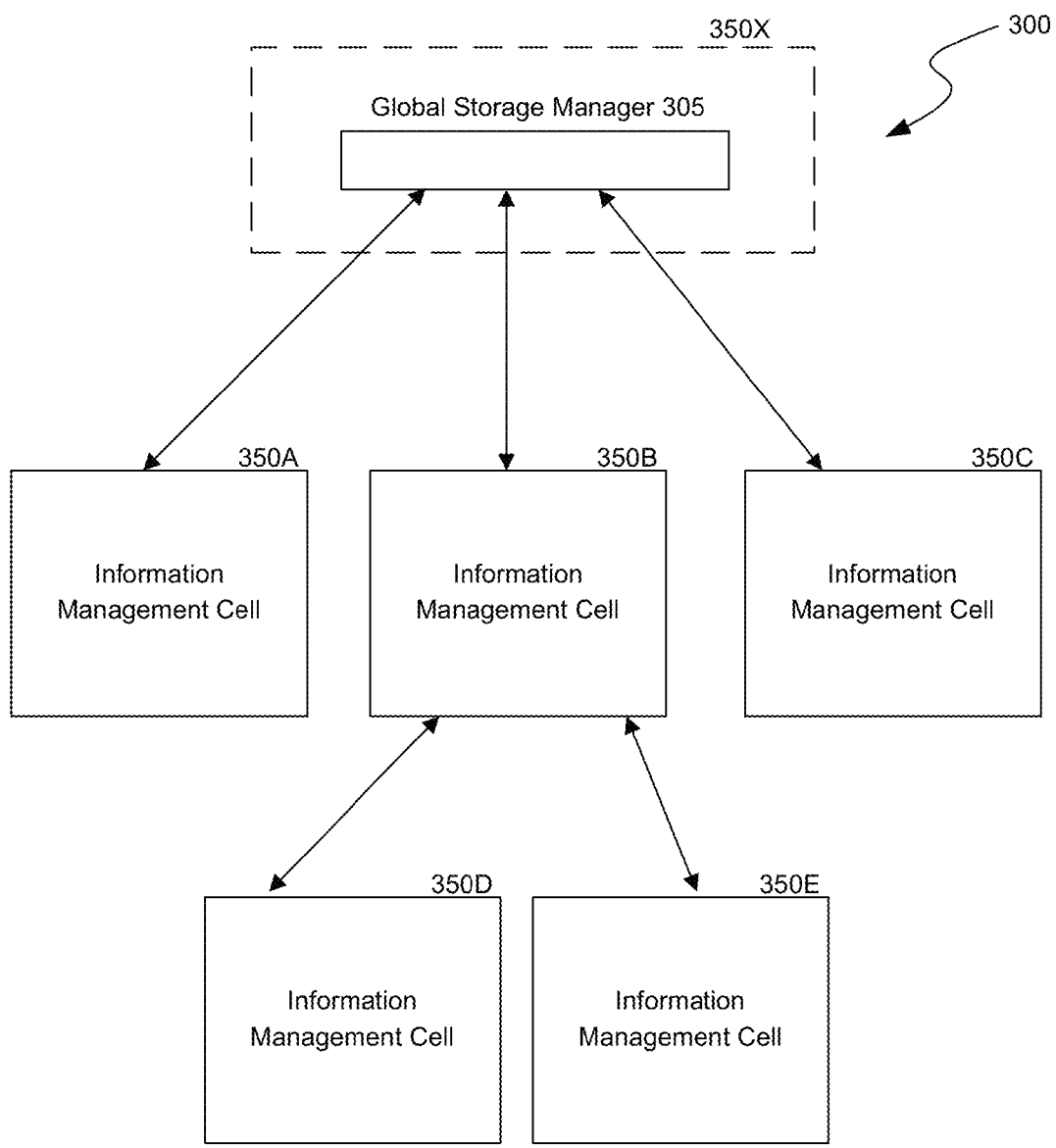
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
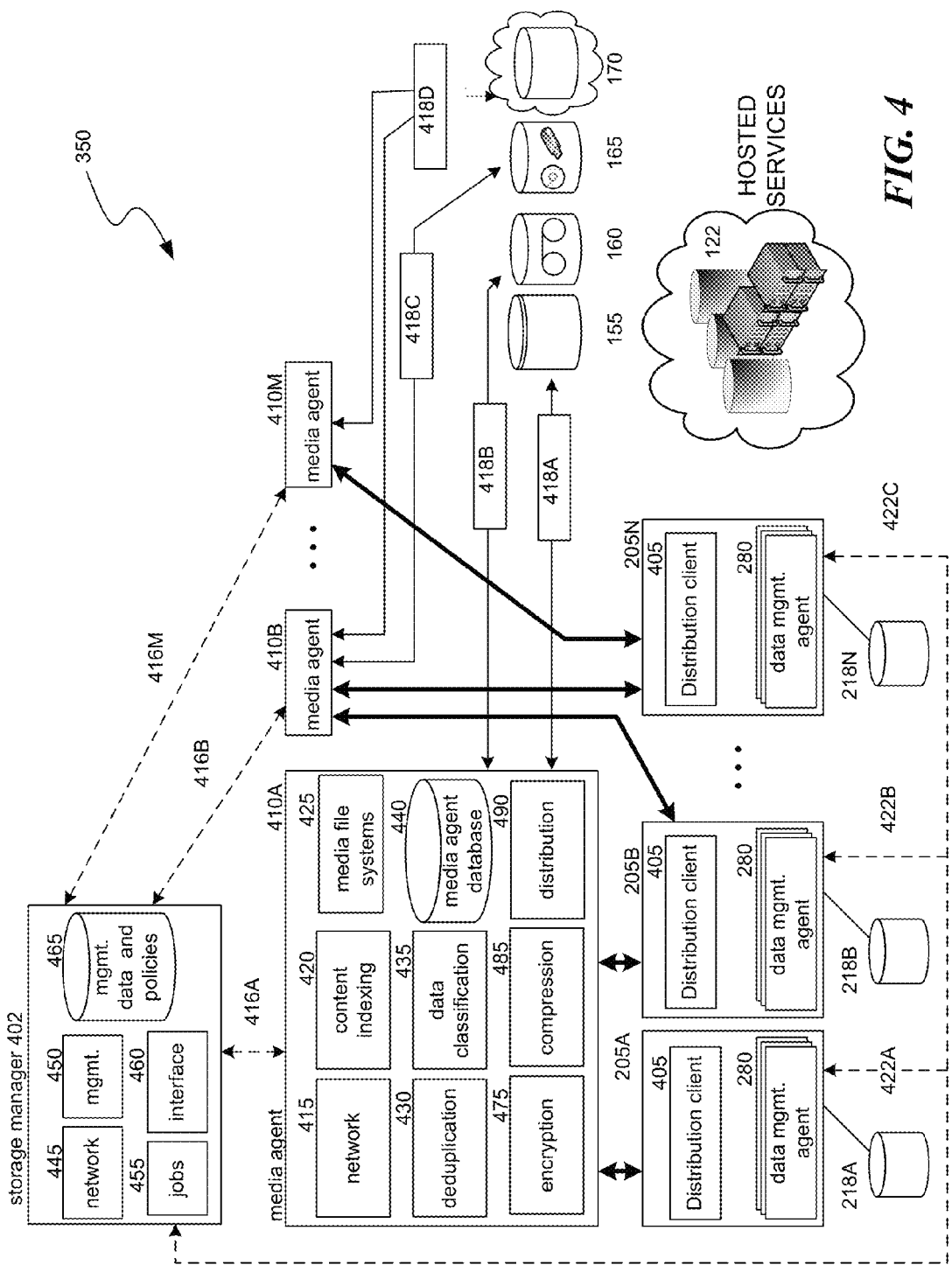
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-170, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;
access control lists or other security information;
the sensitivity (e.g., confidentiality) of a data object as determined by its content and/or metadata;
time-related factors;
deduplication information;
the computing device, hosted service, computing process, or user that created, modified, or accessed a production copy of a data object; and
an estimated or historic usage or cost associated with different components.

The rules may specify, among other things:
a schedule for performing information management operations,
a location (or a class or quality of storage media) for storing a non-production copy,
preferences regarding the encryption, compression, or deduplication of a non-production copy,
resource allocation between different computing devices or other system components (e.g., bandwidth, storage capacity),
whether and how to synchronize or otherwise distribute files or other data objects across multiple computing devices or hosted services,
network pathways and components to utilize (e.g., to transfer data) during an information management operation, and
retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-170. Each media agent 410 may control one or more intermediary storage devices 418, such as a cloud server or a tape or magnetic disk library management system, to read, write, or otherwise manipulate data stored in a non-production storage medium 155-170. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Storage Manager Restoration

As described, the storage manager database 465 includes information useful for operating an entire information management cell 350. Returning to the illustrative example of the jeans manufacturer that was introduced in the background, the following discussion initially assumes that the jeans manufacturer has implemented an information management cell 350, though the present system may be implemented in simpler (or more complex) data storage environments. In order to prevent the loss of access to non-production data stored in non-production storage media 155-170, the jeans manufacturer may apply one or more techniques to its information management cell 350. Of particular interest are techniques that do not require a secondary copy of the storage manager database to be created or maintained prior to the occurrence of a storage manager disaster, or where even the secondary copy is lost/unusable. In a first implementation, if the storage manager encounters a disaster, the jeans manufacturer replaces the old storage manager with a replacement storage manager that includes an installation of a restore agent. The restore agent enables the replacement storage manager to generate the storage manager database without using a secondary copy of the storage manager database. The restoration agent enables the replacement storage manager to generate the storage manager database by reading portions of the content stored by the non-production storage media. In a second implementation, the restoration agent enables the replacement storage manager to restore the storage manager database by gathering and combining information that may be stored in media agent databases 440. Systems and methods related to the first and second implementation are described in greater detail below, followed by additional advantageous uses of the restore agent.

In a third implementation, the jeans manufacturer uses the restore agent to consolidate multiple information management cells 350, i.e., multiple storage managers, into a single information management cell. In a fourth implementation, the jeans manufacturer uses the restore agent to identify, review, and or analyze non-production data that is stored on magnetic tapes, or other non-production storage media, that is associated with an obsolete or no longer operating information management system or cell. These additional advantageous implementations are discussed in more detail after the first and second implementations.

Figure 5:
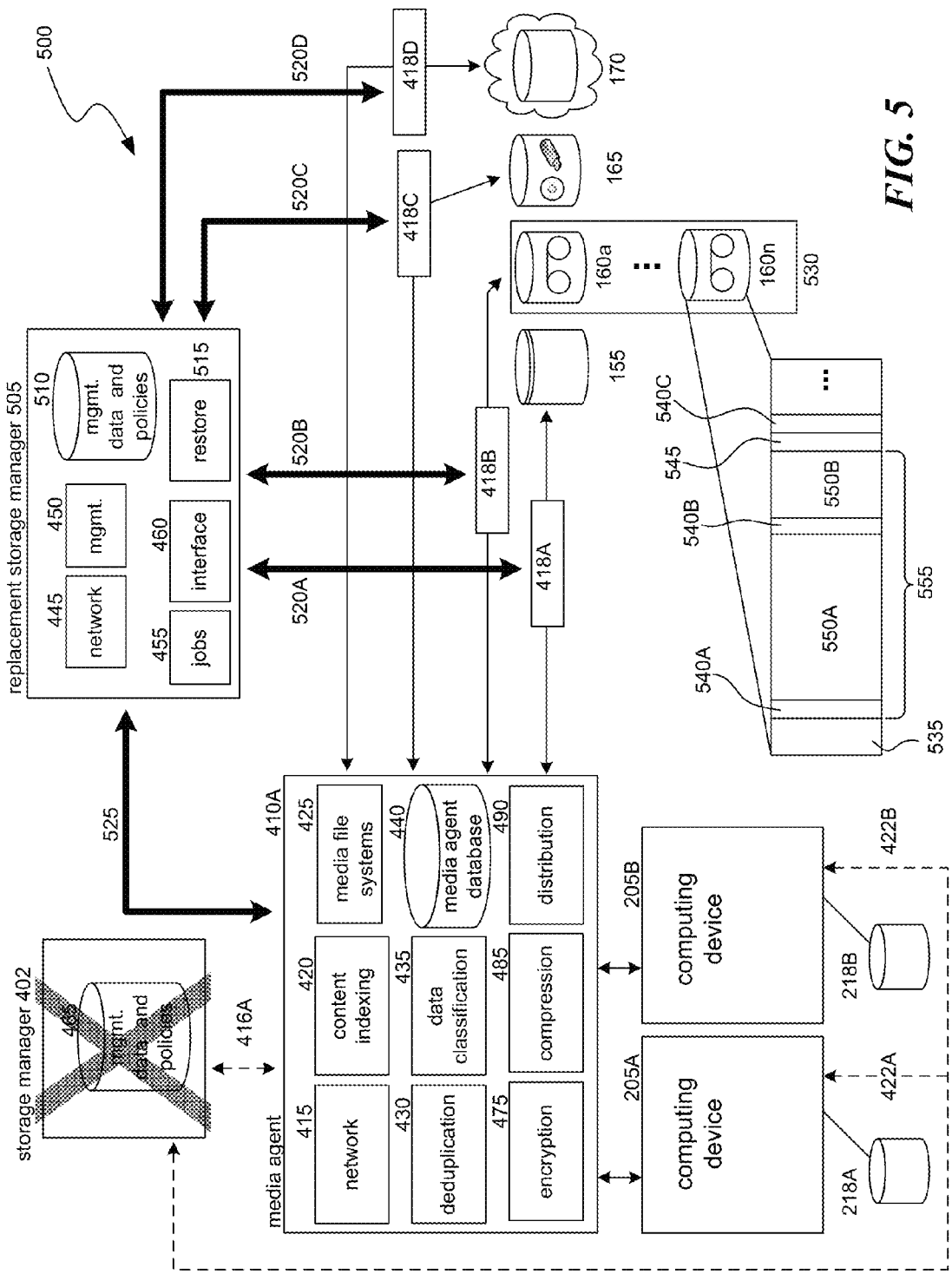
FIG. 5 is a block diagram illustrating an example of a system for recovering a storage manager.

FIG. 5 is similar to FIG. 4, but illustrates an example of an information management cell 500 used by the jeans manufacturer to restore a storage manager database without a secondary copy of the storage manager database saved somewhere within the information management cell 500. (While only one information management cell 500 is shown, the system may readily accommodate multiple cells.) As described above, the jeans manufacturer uses a storage manager, i.e., the storage manager 402, to perform information management operations for information management cell 500. The storage manager 402 includes the database 465 and, under normal operating circumstances, uses the database 465 to map non-production data associated with the computing devices 205 to one or more media agents 410 and to one or more of the non-production storage media 155-170.

Unfortunately, the database 465 may become lost, corrupt, or otherwise inaccessible to the storage manager 402 through a variety of "disasters" (indicated by a large "X" in FIG. 5). Destruction of the database 465 means the systems of the information management cell 500 may no longer have record of which non-production storage media contains non-production data for a particular computing device 205. Therefore, loss of the database 465 becomes a loss of access to secondary copies of important production data for the jeans manufacturer, e.g., accounting, HR, marketing, sales, legal information. An example of a disaster that would render the database 465 inaccessible is a virus or worm that automatically deletes one or more sectors of a hard drive. As another example, the hard drive may become physically damaged by a fire, an earthquake, or by flooding. Less dramatic disasters, such as a head crash due to a faulty air filter or natural aging, may also cause a hard drive to quit working. Whatever the case, the loss of the database 465 via the loss of the hard drive, without some type of secondary copy of the database 465, prevents the jeans manufacturer from being able to immediately restore non-production data to one or more of the computing devices 205.

According to various implementations, the information management cell 500 includes a replacement storage manager 505 that restores the information of the database 465 into a database 510 by using restore agent 515. Using the restore agent 515, the replacement storage manager 505 is able to restore the database 465 even without a secondary copy of the database 465 stored somewhere within the information management cell 500. As a result, in response to a loss of the database 465, the jeans manufacturer may communicatively connect or couple the replacement storage manager 505 to the other systems and components of the information management cell 500 to restore or rebuild the contents of the database 465 into the database 510, i.e., to build the database 510.

The jeans manufacturer can directly or indirectly connect the replacement storage manager 505 to the magnetic tapes 160, or other non-production storage media 155, 165, 170, to build the database 510. In a direct connection implementation, replacement storage manager 505 connects to the magnetic tapes 160 via connection path 520B, where connection path 520B is a subset of connection paths 520 (inclusive of paths 520A, 520B, 520C, 520D). In an indirect connection implementation, replacement storage manager 505 connects to the magnetic tapes 160 via connection path 525. Depending on the location of the magnetic tapes 160, or other non-production storage media, connection paths 520 and 525 may be intranet connections, Internet connections, or a combination of both.

The magnetic tapes 160 include multiple sets of magnetic tapes, such as magnetic tapes 160a-n, as part of a magnetic tape library 530. The magnetic tape library 530 may be located at the facilities of the jeans manufacturer, may be located at a data center, or may be located at a long-term storage facility, such as Iron Mountain. The magnetic tape library 530 includes a tape library management system, represented by intermediary storage devices 418B. Through the tape library management system, the replacement storage manager 505 and/or one or more media agents 410 access the magnetic tapes 160 of the magnetic tape library 530.

Each magnetic tape 160a-n of the magnetic tape library 530 stores one or more headers or other metadata to identify: the magnetic tape 160, the software and hardware sources of the non-production data, the version of the non-production data, the storage and/or retention policy associated with the non-production data, the media agent, the storage manager, the date and time of the creation of the non-production data, and file markers. Some of the headers or metadata are on-media labels (OML) which identify the magnetic tape 160 and distinguish one magnetic tape 160 from another.

To provide background information as to how the restore agent 515 operates, additional information regarding the headers and file markers on the magnetic tape 160 is now provided. Each used magnetic tape 160 includes headers and file markers, i.e. data/metadata that delineates and identifies stored data segments. The headers, file markers, and data segments include a main header 535, file markers 540 (inclusive of 540A, 540B, 540C), file trailer 545, and data segments 550 (inclusive of 550A, 550B).

The main header 535 identifies the magnetic tape 160 and includes information associated with the magnetic tape library 530. The main header 535 occupies a predetermined length or storage capacity at the beginning of each magnetic tape 160. The main header 535 may be an OML that is useful for identifying the magnetic tape 160. The main header 535 may include:

an information management cell ID
tape and/or volume ID;
a slot ID that indicates a slot assignment within the magnetic tape library 530;
a storage capacity of the tape;
an available capacity of the tape;
an index of other headers stored on the tape;
storage manager identification;
media agent identification;
date and time of first and last use;
which storage policy is being used for the data segments 550;
the storage policy name;
client ID, e.g., ID of computing device 205A;
software agent ID;
operating system of the client;
location on the tape of each chunk header;
location on the tape of each file trailer 545, e.g., chunk trailer; and
information related to the encryption used on the content.

The main header 535 may include an encryption key, symmetrical or asymmetrical, stored in a predetermined location within the main header 535. The encryption key is stored within the main header 535 to enable decryption of the content of the magnetic tape 160 by a system or person with knowledge of the location of the encryption key within the main header 535. More details regarding magnetic tape headers, such as OML, are found in commonly-assigned U.S. patent application Ser. No. 10/663,383, entitled "System and Method For Blind Media Support," filed Sep. 16, 2003, now U.S. Pat. No. 7,162,496, which is hereby incorporated by reference herein in its entirety. The tape library management system, media agent 410, and/or replacement storage manager 505 rewrite the main header 535 each time new information is stored on the magnetic tape 160 so the main header 535 is up-to-date and facilitates each subsequent read or write.

File markers 540 precede each data segment 550, and file trailer 545 succeeds each chunk 555, where each chunk comprises a grouping of the data segments 550. The file markers 540 are headers that indicate where on the tape each data segment 550 begins. The file markers 540 include date and time stamps, encryption information, and compression information and do not include all of the information included in the file trailers 545. The file trailer 545 is metadata that indicates where on the tape the chunk 555 ends. The file trailer 545 identifies information that cannot be included in the file markers 540 because the file trailer 545 identifies information that is written to the magnetic tape 160 after the file markers 540 are created. For example, the file trailer 545 includes identification of applications 215 (shown in FIG. 2) and/or data management agents 280 (shown in FIG. 2) associated with each data segment 550. The file trailer 545 identifies the one or more media agents 410 that were used to transfer the content of data segments 550. The file trailer 545 identifies each of the computing devices 205 from which the data segment 550 originates and identifies, in time and/or in distance on the magnetic tape 160. The file trailer 545 also identifies where each of the data segments 550 begin and end. The file trailer 545 further identifies what type of data is included in each of the data segments 550, i.e., email, accounting records, HR records, or the like.

The chunk 555 includes one or more data segments 550 because the information management cell 500 enables a multiplexed transfer of information to the magnetic tapes 160. In other words, once one of the media agents 410 begins transferring information to the magnetic tape 160 for one of the computing devices 205, the media agent 410 or other media agents 410 will queue up information from other computing devices 205 for storage on the magnetic tape 160 within the same chunk. Returning briefly to the jeans manufacturer example, the computing device 205A may be an email server, e.g., an Exchange server, and the computing device 205B may be a materials orders database. While media agent 410A is storing a secondary copy of email messages from the computing device 205A, the media agent 410A may receive a secondary copy of a materials orders database from the computing device 205B. In response, the media agent 410A stores the secondary copy of the materials orders database as data segment 550B after or during the creation of data segment 550A. The chunk 555 is illustrated as including only two data segments 550, however, many more or less data segments 550 may be included in the chunk 555 from more or less than two data management agents and/or applications. The dynamic and multiplexing characteristics of data storage to the magnetic tape 160 underscores the importance of the content of the file trailer 545 because the file trailers 545 associated with all chunks 555 collectively index the contents of the magnetic tape 160.

Having described the information included on the magnetic tapes 160, a description of the restore agent 515 functionality will now be provided. In response to the failure of the storage manager 402 and/or the disaster of the database 465, the jeans manufacturer connects the replacement storage manager 505 to the information management cell 500. Connecting the replacement storage manager 505 to the information management cell 500 enables the restore agent 515 to build the database 510, i.e., restore the database 465, from the headers and metadata stored in the magnetic tapes 160. The restore agent 515 is a software module that may be installed on the replacement storage manager 505 at the same time as the other storage manager agents or may be installed independent of the installation of the other storage manager agents.

The restore agent 515 uses one or more of the storage manager agents, e.g., the network agent 445, the management agent 450, and the interface agent 460, to build the database 510. The interaction between the restore agent 515 and the other storage manager agents will be discussed in combination with the functionality of the restore agent 515.

Figure 6:
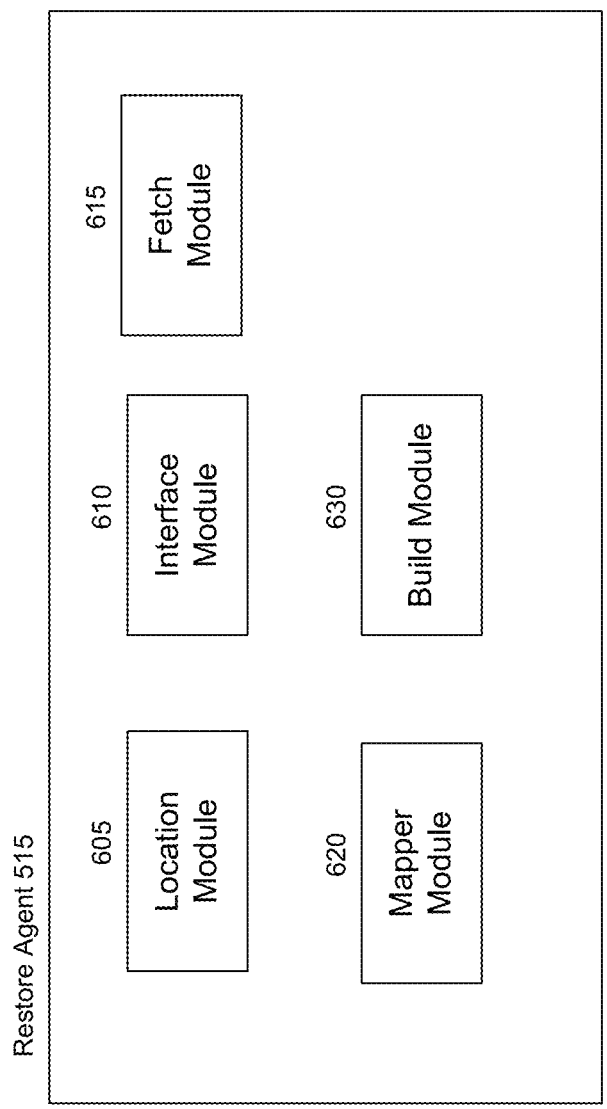
FIG. 6 is a block diagram illustrating an example of a restore agent.

FIG. 6 illustrates that the restore agent 515 may include several sub-modules or components to facilitate the restoration of a storage manager database 465. The restore agent 515 includes a location module 605, an interface module 610, a fetch module 615, a mapper module 620, and a build module 630.

Location module 605 determines where, within the information management cell 500, the non-production data is stored. The location module 605 automatically scans the information management cell 500 to locate and identify each of non-production storage media 155-170. The location module 605 uses the network agent 445 to locate and identify the non-production storage media 155-170 through direct connection paths 520. Through the direct connection paths 520, the location module 605, using the network agent 445, identifies the non-production storage media using their corresponding intermediary storage devices 418. The intermediary storage devices 418 may be tape, disk, or other library management systems. Through the indirect connection path 525, the location module 605, via the network agent 445, identifies each media agent 410 in the information management cell 500. The location module 605, via various API, can receive identification handles or network addresses of the various non-production storage media 155-170 from the media agents 410, by requesting that each media agent 410 report the desired information to the location module 605. Thus, the location module 605 enables the restore agent 515 to gather information from all non-production storage media 155-170 within the information management cell 500.

Figure 7:
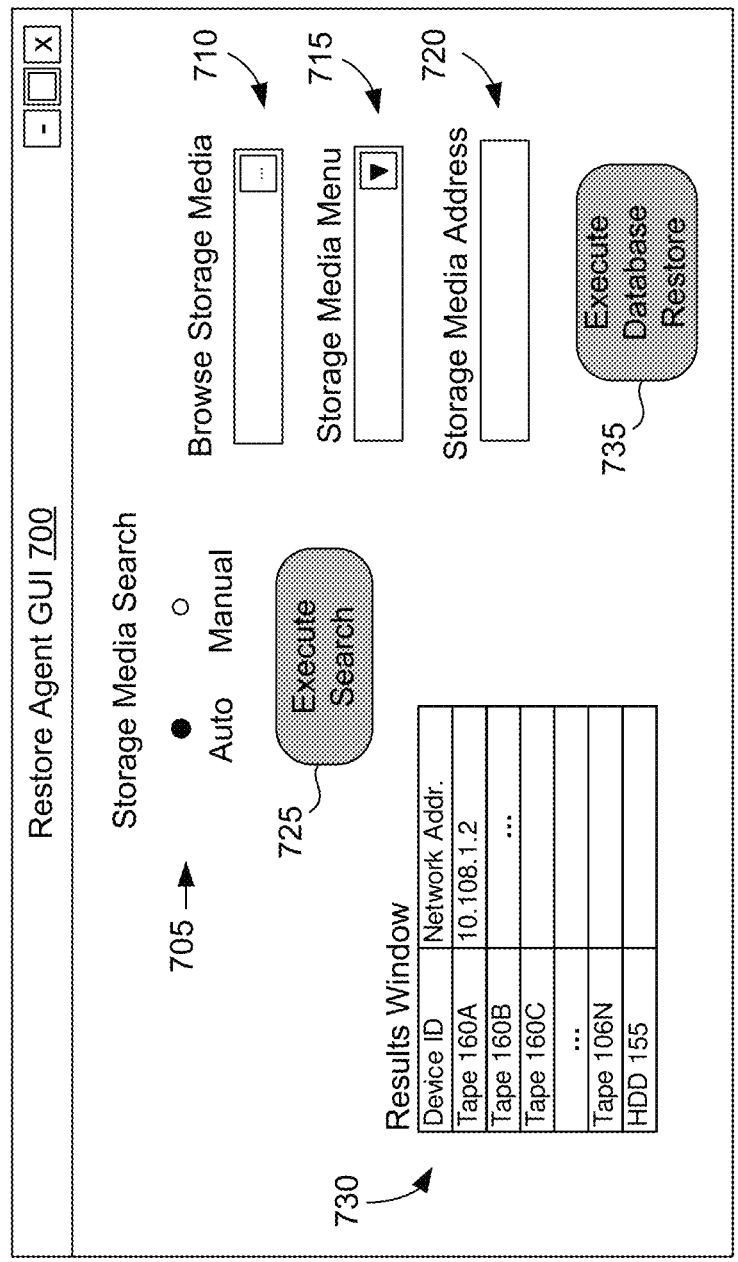
FIG. 7 is a diagram illustrating an example of a restore agent user interface.

The interface module 610 enables a user to control the functions of the restore agent 515. The interface module 610 generates a graphical user interface (GUI) and includes one or more user interface objects, such as buttons, menus, dialog boxes, and the like. An example GUI is illustrated in FIG. 7 and is discussed later. Through the interface module 610, a user selects one or more of the non-production storage media 155-170 that were identified by the location module 605. The interface module 610 also enables the user to manually enter or browse for additional non-production storage media or media agents, which may not have been identified by the location module 605. The interface module 610 generates one or more user interface objects that enable the user to execute a fetch operation to begin building the database 510. The interface module 610 also enables the user to set the restore agent 515 to automatically build the database 510 in response to locating one or more non-production storage media 155-170. In some implementations, the interface module 610 relies on information processing and display software functionalities of the interface agent 460 to receive instructions from the user.

The fetch module 615 retrieves the headers and metadata from the nonproduction storage media 155-170 needed to build the database 510. The fetch module 615 uses a handle identifier and network address for the magnetic tapes 160. The fetch module 615 reads the main header 535, the file markers 540, and the file trailer 545. The fetch module 615 reads each of the magnetic tapes 160a-160n by transmitting instructions to the magnetic tape library 530 so that each of the magnetic tapes are systematically loaded and read. Importantly, the fetch module 615 does not read or retrieve the contents of data segments 550. Instead, the fetch module 615 retrieves less than all of the content stored on each of the magnetic tapes 160. Advantageously, because the fetch module 615 retrieves less than all of the content stored on each the magnetic tapes 160, the fetch module 615 is able to retrieve the information needed to build the database 510 without performing time and resource intensive operations, such as reading all the data or content indexing each magnetic tape 160. Rather, the fetch module 615 is able to quickly scan the contents of the magnetic tapes 160 for the main headers 535, the file markers 540, and/or file trailers 545 to obtain the information used for building the database 510.

The data stored on the magnetic tapes or other media can also include information identifying individual clients, and type of clients, such as information that a client is a SQL server. Indeed, each tape may store data will, different clients within an organization, such as the jeans manufacturer. The tape you can likewise data regarding when data from each client was copied onto that piece of media. Further, each tape can include information regarding the configuration parameters of each client. All of this information can then be used to re-create a table or other data structure representing a logical mapping or architecture for the system. The table can include granular information including data regarding each client, files/folders and other data copied from each client, and the date and time of each copy or backup job.

The mapper module 620 creates an interim table from the headers and other metadata retrieved from the non-production storage media 155-170. The mapper module 620 extracts content from the retrieved headers and metadata and organizes the information based on common characteristics. As example interim table is shown below as Table 1.

TABLE 1

| Device ID | Media Agent | Tape ID | Network Addr. | Storage Type | Segment ID |
|---|---|---|---|---|---|
| CD 205A | MA 410A | tape 160C | 10.108.1.123 | Full Back up | 550G |
| CD 205A | MA 410A | tape 160A | 10.108.1.2 | Incr. Back up | 550A |
| CD 205B | MA 410A | tape 160N | 10.108.1.245 | Snap-shot | 550B |
| ... | | | | | |

Table 1 includes columns for device ID, media agent, tape ID, network address, storage type, and data segment ID. Table 1 may include many more or less columns than are shown. Table 1 is sorted by device ID but may be sorted by content of other columns as well. As shown, the table includes two entries for computing device 205A and one entry for computing device 205B. The first row of Table 1 illustrates examples of information that is extracted from headers and metadata stored on the magnetic tapes 160. The first row of Table 1 indicates that an entry for computing device 205A was found on magnetic tape 610C located at network address 10.108.1.123. The media agent 410A created data segment 550G as a full backup copy. Table 1 shows that data segments 550G and 550A for computing device 205A are stored on different magnetic tapes having different network addresses. Table 1 also shows that media agent 410A stored data segments 550A and 550B for computing devices 205A and 205B on the same magnetic tape 410A using different types of secondary copies. By extracting the information from the retrieved headers and metadata, the mapper module 620 enables the build module 630 to restore the database 465 by building the database 510.

The build module 630 creates and/or populates the database 510 based on the interim tables created by the mapper module 620. As new interim tables are created by the mapper module 620, the build module 630 transmits read and write commands to the database 510 to insert the rows of the interim tables into the database 510. The build module 630 may mark or delete the portions of the interim tables that have been inserted into the database 510 in order to free up or reallocate memory for use by the mapper module 620. The mapper module 620 and the build module 630 continue to build or update the database 510 until all identified or selected non-production storage media have been scanned.

Upon completion of building the database 510, the interface module 610 may update the user interface to indicate completion of the task. For example, the interface module 610 may cause a GUI to display a dialog box which reads, "The storage manager restoration is complete." Once restored, the database 510 includes indexes of content of portions of, or all of, the non-production storage media 155-170 within the information management cell 500. Using the restored database 510, the replacement storage manager 505 may resume the operations of storage manager 402. In other words, because the jeans manufacturer connected the replacement storage manager 505 to the information management cell 500 and executed the restore agent 515, the jeans manufacturer can continue to review, schedule, and manage the creation and restoration of secondary copies of production data associated with the computing devices 205. Since the database 510 now mirrors at least some of the content of the database 465, all accounting records, HR records, materials orders databases, and any other information that was transferred to the non-production storage media 155-170 can be used to restore any one or more of the computing devices 205 to a particular point in time, in accordance with the storage policies associated with the stored versions of the non-production data.

FIG. 7 illustrates an example restore agent GUI 700 that is provided by the interface module 610 of the restore agent 515, with or without the support of the interface agent 460. The restore agent GUI 700 includes an automatic option and a manual option to search non-production storage media. The restore agent GUI 700 enables selection between automatic search and manual search using radio buttons 705. In manual mode, the restore agent GUI 700 enables a user to search for non-production storage media by providing various interfaces. In particular, the restore agent GUI 700 includes a browser menu 710, a drop-down menu 715, and a text box 720. The restore agent GUI 700 enables the user to execute the storage media search with search button 725. Upon completion of the search, the interface module 610 may display the automatically or manually identified storage media in a results window 730. The user may then use the execute database restore button 735 to initiate operation of the mapper module 620 and the build module 630 to create and/or update the database 510.

Referring back to FIG. 5, in some implementations, the replacement storage manager 505 builds the database 510 via an indirect connection with the non-production storage media 155-170. That is, replacement storage manager 505 can build the database 510 without using connection paths 520 and instead relies on connection paths 525 to each of the media agents 410 in the information management cell 500. This implementation was mentioned briefly during the description of the location module 605 and is reiterated here to emphasize that the replacement storage manager 505 may be connected to the non-production storage media 155-170 directly or indirectly, i.e., using various techniques.

The restore agent 515 can be used to provide beneficial services other than post-disaster restoration of a storage manager database. For example, the restore agent 515 can be used to replace multiple storage managers with a single storage manager as an information management cell consolidation process. The restore agent 515 can also be used for reviewing archived non-production data of an obsolete or non-operating information management cell. However, prior to discussing these alternative uses for the restore agent, methods for recovering a storage manager database are discussed. The methods provide further enablement for operating the restore agent 515.

Figure 8:
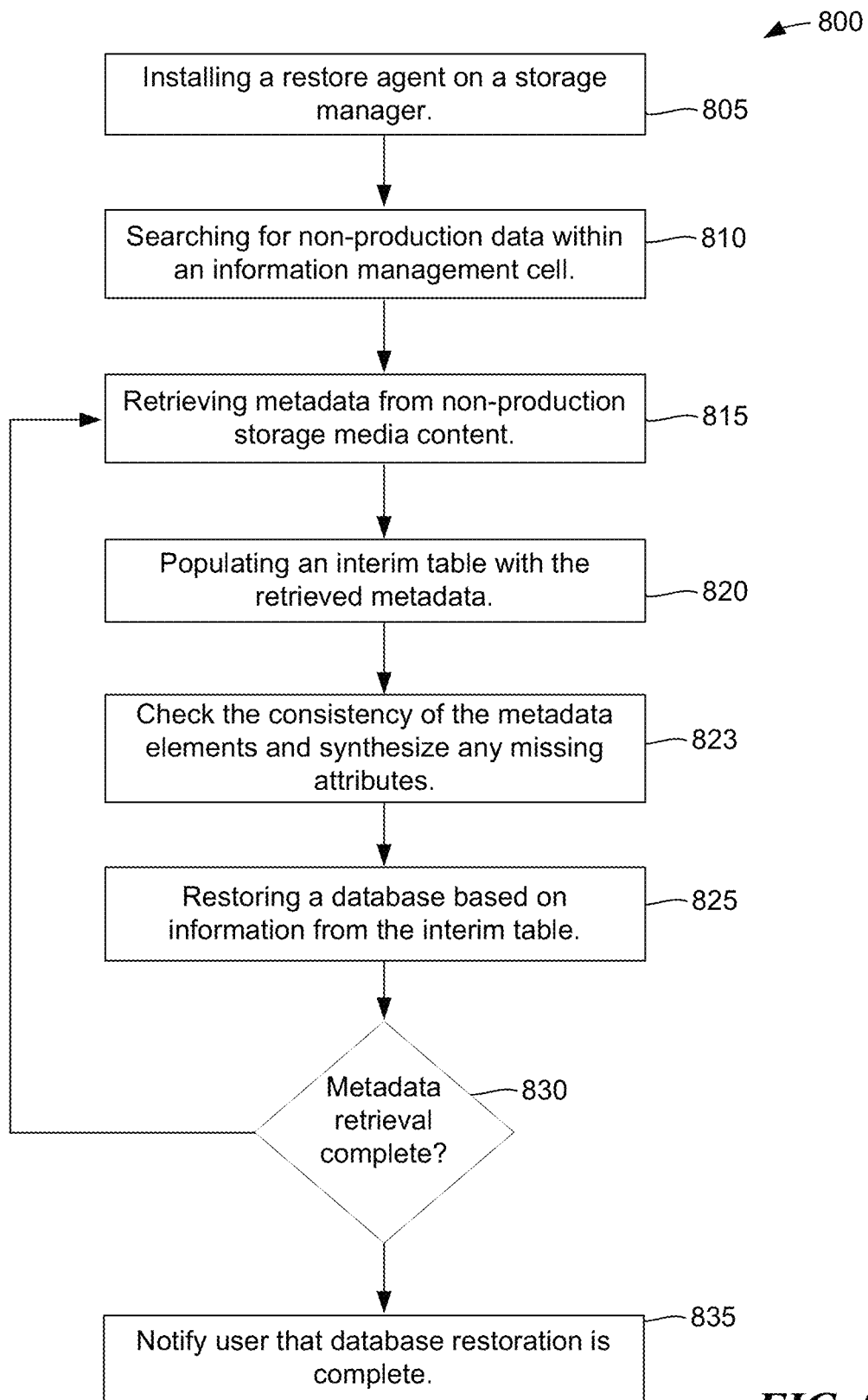
FIG. 8 is a flow chart representation of a process of restoring a storage manager database.

FIG. 8 illustrates a method 800 of recovering a storage manager database with or for a replacement storage manager, as part of a database disaster recovery. The storage manager database includes an index of all secondary copies or non-production data stored by magnetic tapes or magnetic tape libraries. The storage manager database also includes an index of non-production data stored by other types of non-production storage media, such as magnetic drives, optical drives, cloud storage, solid-state drives, and the like.

At block 805, a user, such as the jeans manufacturer, installs a restore agent on a replacement storage manager. The user may install the restore agent using a number of techniques known to those of ordinary skill in the art. For example, the user may install the restore agent using a floppy-disk, a CD, a DVD, a USB drive, a network drive, may install the restore agent from the Internet as part of a purchased software package, or otherwise access the agent via network connections. Installing the restore agent on the replacement storage manager enables the restore agent to interact with other software agents or modules on the storage manager.

At block 810, the restore agent searches for the locations of all non-production data within an information management cell. The restore agent uses a location module to perform the search. The location module identifies locations of all non-production data by scanning every magnetic tape and magnetic tape library within the information management cell. The location module may also scan all other storage media in the information management cell to identify other storage media which include names, handles, network IDs, or other information that identify the storage media as being non-production storage media. The location module may also identify locations of all non-production data within the information management cell by reading a portion of every storage medium in the information management cell, e.g., the first 5 MB of information where a main header may be stored. Alternatively or additionally, the location module communicates with the media agents within the information management cell to request that each media agent identify all non-production storage media in use by or identified by the media agent.

The restore agent performs automated searches, manual searches, or a combination of automated searches and manual searches of the information management cell. In an automated search, the restore agent scans all storage media in the information management cell or searches all storage media identified by the media agents. In a manual search, the restore agent searches in storage media or in network locations of storage media that are identified by a user. In the combined automated and manual search, the restore agent searches through all storage media of a particular network location that is identified by a user.

At block 815, the restore agent retrieves a portion, but need not retrieve all, of the non-production storage media content. The restore agent retrieves the portion of the non-production storage media content that includes headers and other metadata that identifies characteristics of the non-production data and that identifies the location of the non-production data on the storage media. The restore agent uses the fetch module to retrieve the headers and metadata. The headers and metadata include main headers, OML, file markers, file trailers, tables of contents, allocation tables, and other file system data or metadata useful for identifying content or characteristics of the non-production data. The headers and other metadata provide information such as the type of secondary copy used on the non-production data, the ID of media agent that created the secondary copy, the ID of the storage manager of the information management cell, the ID of the magnetic tape or other non-production storage medium, storage capacity, the remaining storage capacity, start and stop markers for each file or segment of data, and the like. To retrieve this information, the fetch module may send commands and requests from the replacement storage manager via a network agent of the storage manager because the network agent provides a communication link with all other parts of the information management cell.

At block 820, the restore agent extracts content from the retrieved headers and metadata and organizes the extracted content in an interim table or other data structure. The restore agent uses a mapper module to extract and organize the extracted content. The mapper module creates and populates an interim table with a structure that is similar or the same as the database that is being restored. The interim table includes information that is associated with each data file or data segment stored on the magnetic tape. The interim table includes information such as an ID of the computing device associated with the non-production data, the media agent associated with the computing device, an ID of the magnetic tape or other non-production storage medium, the format of the secondary copy, etc.

At block 823, the restore agent checks the consistency of the metadata elements and synthesizes any missing attributes. For example, if a computing device name is missing from the metadata, the restore agent may parse or extract the computing device name from a file system directory for the computing device. Other techniques may be used to synthesize or fill in missing information, such as using a network identifier to request the information directly from the computing device for which the metadata is missing, or accessing a network accessible database of metadata (a metabase).

At block 825, the restore agent creates or populates the restore database based on the interim tables or data structures created by the mapper module. The restore agent uses a build module to update the restored database. The build module transmits read and write commands to the database to insert the rows of the interim tables into database.

At block 830, the restore agent determines if the fetch module has completed retrieving information from all identified or selected magnetic tapes. If the fetch module indicates that all of the identified or selected magnetic tapes have been scanned, the restore agent indicates that the restore operation is complete at block 835. If the fetch module indicates that additional magnetic tapes or other non-production media need to be scanned, the process returns to block 815.

As described, the restore agent can be used to create or restore a storage manager database that indexes or maps all secondary copies or non-production data stored in an information management cell. The restore agent can be used to benefit computing devices other than a storage manager, such as a media agent.

Figure 9:
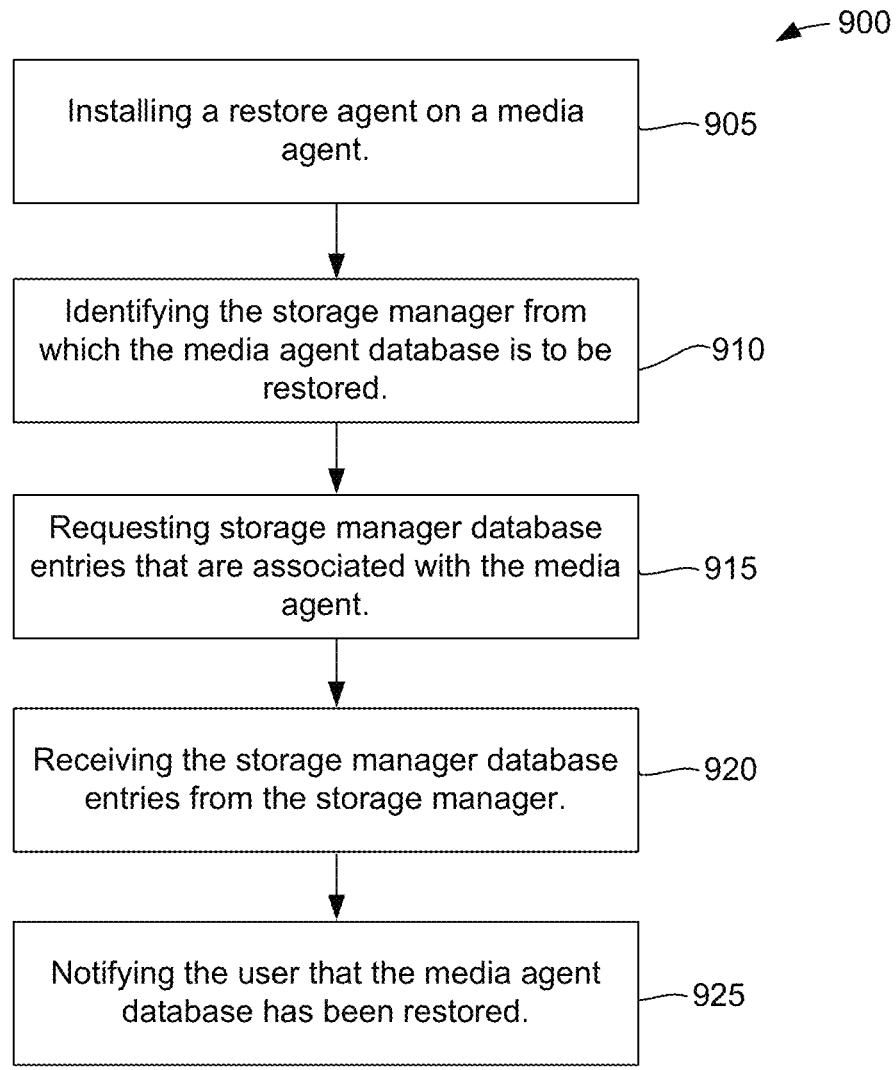
FIG. 9 is a flow chart representation of a process of restoring a media agent database.

FIG. 9 illustrates a method 900 for restoring a media agent database. When a storage manager database encounters a disaster, the content of the non-production storage media can become difficult to use to restore non-production data to a computing device. Similarly, if a media agent database encounters a disaster, it can become difficult to restore non-production data to a computing device managed by the media agent. In some implementations of an information management cell, each media agent receives, from a storage manager, settings and instructions for implementing an information management policy for one or more computing devices. The media agent stores these various settings and instructions in the media agent database. As the media agent executes the information management policy for the computing devices, the media agent updates the media agent database with information that correlates the computing devices with the secondary copies of production data that are stored on magnetic tapes or other non-production storage media. Because a storage manager database includes the information of the media agent database, the process of restoring a media agent relies on information stored in the storage manager database.

At block 905, a user installs a restore agent on the media agent. As discussed in the method 800, many techniques can be used to install the restore agent on the media agent, e.g., CD, DVD, USB drive, or the like.

At block 910, the restore agent identifies the storage manager from which the media agent database will be rebuilt. The restore agent identifies the storage manager automatically or with manual assistance from a user. If the restore agent identifies the storage manager automatically, the restore agent searches the information management cell for the storage manager that controls the cell. If the restore agent identifies the storage manager manually, a user enters a handle or other network ID for the storage manager, or the user browses through a GUI to identify the storage manger.

At block 915, the restore agent requests, from the storage manager, all of the storage manager database entries that are associated with the media agent sending the request. As part of the request, the restore agent sends an identifier of the media agent. The identifier of the media agent can be a network address within the information management cell or the identifier can be an alphanumeric code. If the media agent does not know its own identifier within the information management cell, the media agent transmits an identification of one or more of the computing devices to which the media agent is connected and responsible for managing. In response to the request from the restore agent of the media agent, the storage manager queries the storage manager database and transmits the pertinent portions of the storage manager database to the media agent.

At block 920, the restore agent receives the storage manager database entries associated with the requesting media agent. The restore agent subsequently creates and populates a media agent database based on the received storage manager database entries.

At block 925, the restore agent notifies the user that the media agent database has been restored. With the restored media agent database, the media agent verifies that each of the non-production storage media identified in the media agent database are accessible. The restore agent provides a warning or error notification if components within the information management cell conflict with the contents of the restored media agent database.

Figure 10:
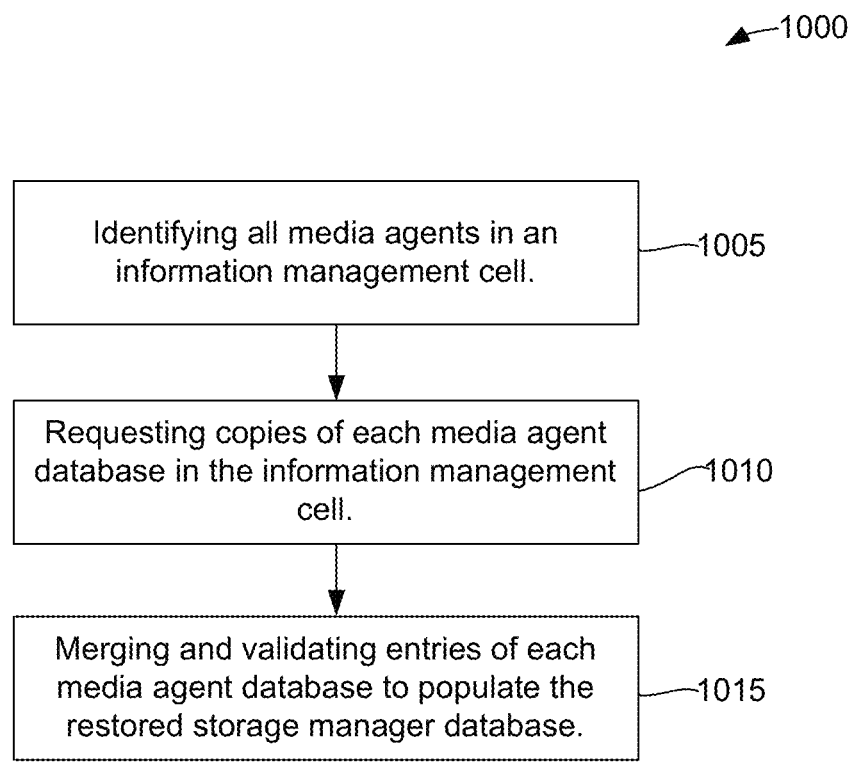
FIG. 10 is a flow chart representation of a process of restoring a storage manager database, according to another implementation.

FIG. 10 illustrates a method 1000 of restoring a storage manager database from media agent databases existing within an information management cell. As an alternative to restoring a storage manager database by scanning all non-production storage media in the information management cell, a replacement storage manager can rebuild or reconstruct a storage manager database by combining the media agent database entries of each media agent in the information management cell. The replacement storage manager uses a restore agent to rebuild the storage manager database.

At block 1005, the restore agent identifies all media agents in the information management cell. The restore agent identifies all media agents in the information management cell by identifying all computing devices within the information management cell and by enabling a user to select or otherwise determine which of all the computing devices are configured as media agents. Alternatively, the restore agent identifies all media agents in the information management cell by, as an example, sending echo request packets to software network modules that operate on the media agents.

At block 1010, the restore agent requests copies of each media agent database in the information management cell. The request can be a request for all entries in the media agent database, a request for all active entries in the media agent database, or can be a request for all entries within the media agent database that have been modified or updated within a defined time frame, e.g., within the last 2 years. In response to the request, the media agent transmits all or part of the entries of the media agent database to the storage manager.

At block 1015, the restore agent merges and validates the received entries of each of the media agent databases to populate the restored storage manager database. While merging the received entries, the restore agent adds information to the entries to distinguish the entries of one media agent database from another media agent database. In one implementation, the restore agent adds a column to the media agent database entries that identifies the media agent that transmitted the media agent database entries. The restore agent may also validate the received entries by pinging, or otherwise sending an echo request, to the devices included with each entry.

Information Management Cell Consolidation

A replacement storage manager and a restore agent can be used to provide beneficial services other than disaster recovery of a database. For example, he replacement storage manager and restore agent can be used to replace multiple storage managers with a single storage manager to consolidate multiple information management cells into a single information management cell. In an economy where companies grow and shrink rapidly, infrastructure needed to support those companies also grows and shrinks rapidly. Returning to the example of the jeans manufacturer, while demand for jeans was high, the jeans manufacturer may have added significant numbers of employees to support production. The jeans manufacturer may have also expanded its information technology (IT) resources to accommodate the execution of storage and retention policies for the computing devices in use by the employees. However, with a downturn in economy, such as after the great recession of 2008, the jeans manufacturer may have significantly reduced its employment force, reduced the number of computing devices in operation for the business, and as a result may have a need to scale back its information management resources.

Figure 11:
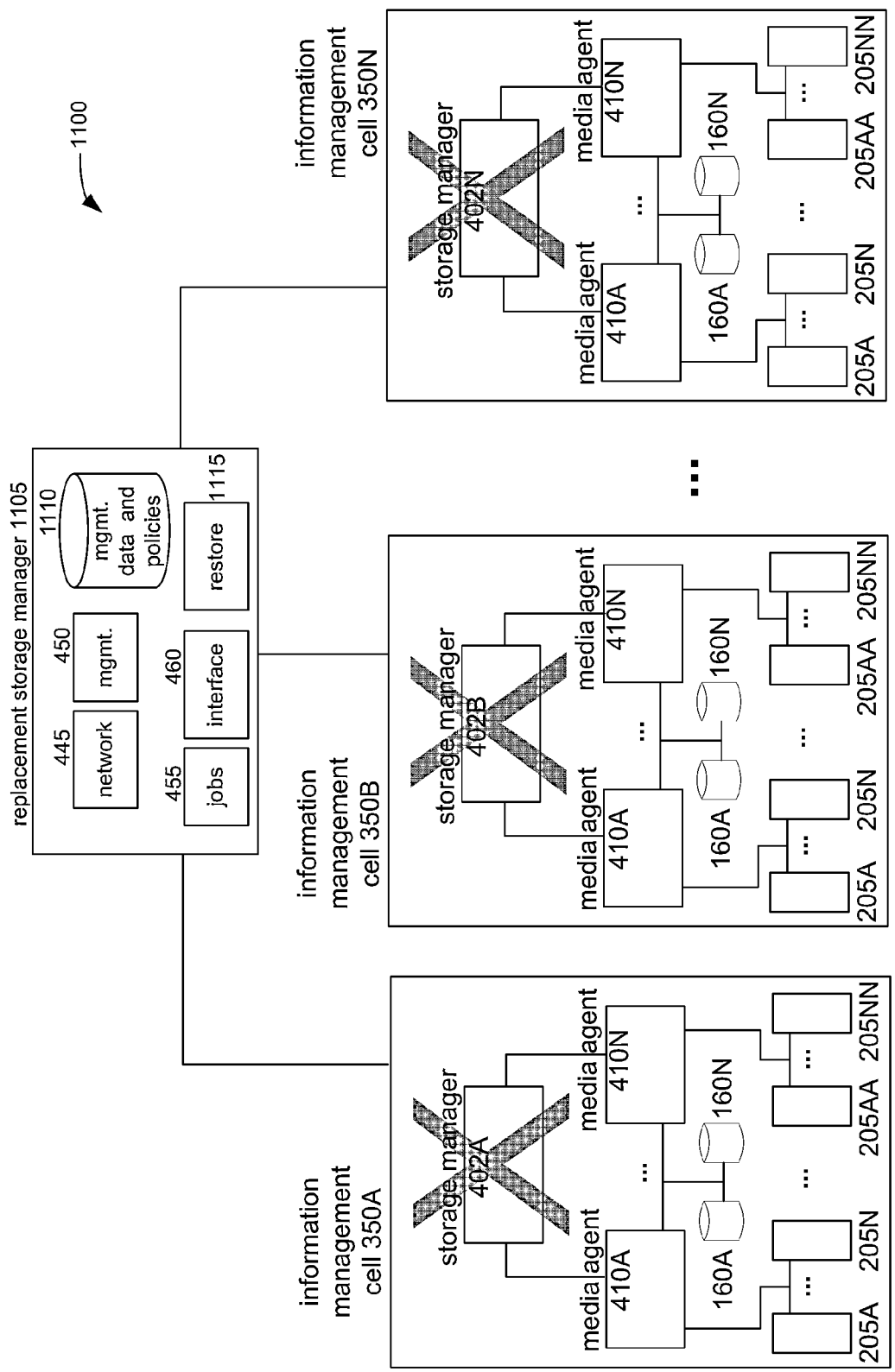
FIG. 11 is a block diagram illustrating an example of a system for consolidating multiple information management cells.

FIG. 11 illustrates a computing environment 1100 which includes a replacement storage manager 1105 that enables scaling-back or downsizing information management resources. The replacement storage manager 1105 consolidates the information and operations of multiple storage managers 410A, 410B, . . . , 410N (collectively, storage managers 410) into a single replacement storage manager 1105. The advantages of consolidating the operations of multiple storage managers 410 are many-fold. Reducing the number of operating computing devices results in lowered energy consumption and energy costs. Reducing the number of operating computing devices results in less parts to replace, clean, and otherwise maintain. Therefore, reducing the number of operating computing devices enables a company to operate with a smaller IT group.

The replacement storage manager 1105 consolidates the operations of the storage managers 402 of the information management cells 350 by transferring the content of the storage manager databases to the replacement storage manager database 1110 ("the database 1110"). The replacement storage manager 1105 transfers the content of the storage manager databases of the information management cells 350 with the restore agent 1115.

The restore agent 1115 includes one or more of the software modules of the restore agent 515 (shown in FIG. 5) and additionally enables the consolidation of multiple information management cells 350 into a single information management cell. Once a user connects the replacement storage manager 1105 to the computing environment 1100, the restore agent 1115 automatically or manually identifies the storage managers 402 of the computing environment 1100. The restore agent 1115 communicates with storage managers 402 via the management agent 450. The management agent 450 provides an interface that allows various management agents 450 in multiple information management cells 350 to communicate with one another. This allows each information management cell 350 to exchange status information, routing information, capacity and utilization information, and information management operation instructions, policies, and database entries with other cells. The restore agent 1115 requests copies of the storage manager database entries from the storage managers 402. Upon receipt of the storage manager database entries, the restored agent 1115 modifies the entries to identify which storage manager 402 the entries originated from. The restore agent 1115 then merges the modified storage manager database entries by updating the database 1110 with the modified storage manager database entries. The restore agent 1115 notifies the user upon completion of the consolidation of the storage manager databases of the information management cells 350. Upon completion of the consolidation, a user may remove each of the storage managers 402 from the computing environment 1100. In alternative implementations, the replacement storage manager 1105 builds and/or updates the database 1110 with the restore agent 1115 by scanning all of the magnetic tapes 160, or other non-production storage media, in the computing environment 1100 for metadata associated with the non-production data stored on the magnetic tapes 160 in a similar manner to that discussed above.

The disclosed consolidation of the multiple storage managers 402 by the replacement storage manager 1105 includes benefits for the computing environment 1100 that are not appreciated by a mere merger or consolidation of standard databases. The consolidation performed by replacement storage manager 1105 enables the computing environment 1100 to seamlessly continue performing information management policy operations during the transition from multiple information management cells to a single information management cell. Both employers and employees are regularly interrupted by IT department notifications stating that one or more important networks will be down for a specified or unspecified duration of time. Such notifications from IT departments are both unsettling and inconvenient. In the case where intentionally-downed computing devices or networks may result in the loss of information that is critical to the operations of the business, the ability for the replacement storage manager 1105 to enable continued information management policy operations, while seamlessly transitioning the storage managers 402 off-line, can be an important an invaluable feature of the system to businesses.

Although the computing environment 1100 illustrates the replacement storage manager 1105 replacing multiple storage managers 402, the replacement storage manager 1105 enables even further consolidation of computing devices within the computing environment 1100. A media agent and a storage manager can be installed on a single computing device and share resources for the operation of an information storage policy for a number of computing devices. In some implementations, where the storage needs of computing devices in an information management cell exceed the resource capacity of a single computing device, one or more media agents may be separated from a storage manager and installed on independent computing devices. If a company, such as the jeans manufacturer, has sufficiently reduced the number of computing devices in operation or has reduced the frequency or quantity or quality of secondary copies transferred to non-production storage media, the functions of all of the media agents 410 of all of the information management cells 350 may be consolidated into the replacement storage manager 1105 using the techniques described above. In particular, the restore agent 1115 updates the database 1110 with the media agent database entries of the media agents 410 in addition to the storage manager database entries of the storage managers 402. The software modules associated with the media agents 410 are also installed onto the replacement storage manager 1105 to enable the replacement manager 1105 to perform the various operations of the media agent, such as deduplication, encryption, and compression of production data received from computing devices 205.

Figure 12:
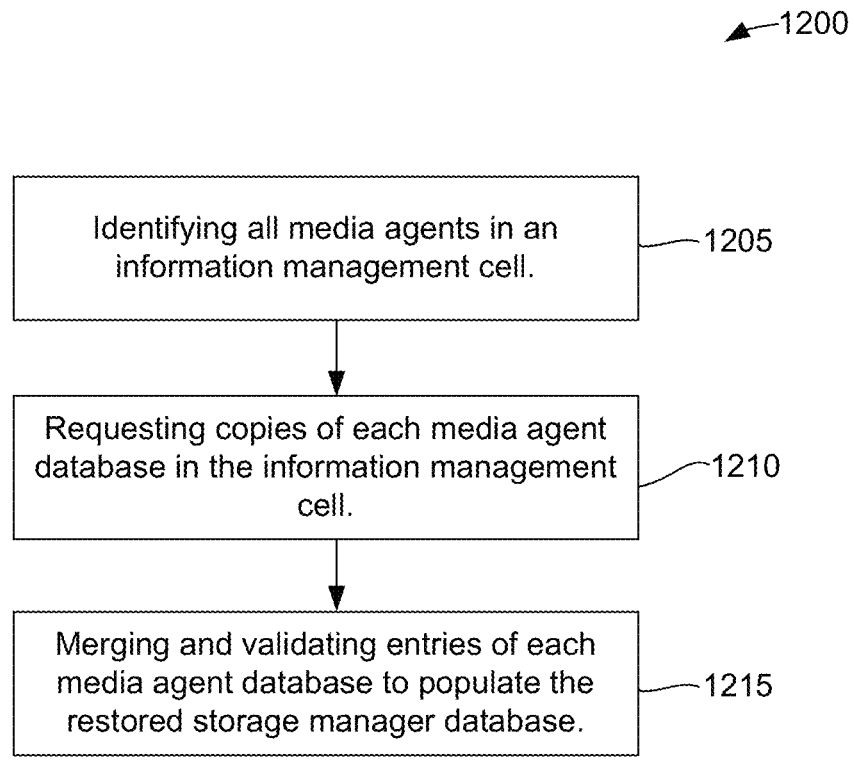
FIG. 12 is a flow chart representation of a process of consolidating multiple information management cells.

FIG. 12 illustrates a method 1200 of consolidating or aggregating multiple storage manager databases from multiple information management cells into a single cell with a single replacement storage manager. As discussed above storage manager consolidation may have many benefits, such as lower energy costs and lower maintenance requirements.

At block 1205, the replacement storage manager identifies all of the storage managers to be consolidated. The replacement storage manager may automatically consolidate all other identified information management cells, or may receive instructions from a user, e.g., via a user interface. The system may also automatically access a table of accessible storage managers, or automatically crawl the network to locate such storage managers.

At block 1210, the replacement storage manager requests copies of each storage manager database from each information management cell that has been identified for consolidation. The replacement storage manager includes a management agent which provides an interface to enable various management agents in multiple information management cells (or in a global storage manager) to communicate with one another. This allows each information management cell to exchange status information, routing information, capacity and utilization information, and information management operation instructions or policies with other cells. The replacement storage manager user the management agent, or other inter-cell communication technique to request and receive copies of the storage manager databases from the identified storage mangers.

At block 1215, the replacement storage manager aggregates the metadata of each of the received databases into a single replacement storage manager database. The replacement storage manager may test its connections with each computing device and storage device listed in the consolidated database using, for example, a network agent. The replacement storage manager may notify an administrator of unresponsive devices and may remove obsolete or unresponsive devices from the database. Once connections to the computing device of the consolidated information management cell have been tested, the replacement storage manager notifies an administrator that the consolidated storage managers may be removed from the system.

As a result, a smaller, more energy efficient, and more cost efficient system replaces its conglomerate predecessor. However, if needed, a reverse process can be used to divide the replacement information management system into multiple information management systems by selectively copying portions of the replacement storage manager database over to newly added storage managers.

Information Management for Obsolete Systems

A replacement storage manager and restore agent can be used to provide beneficial services in addition to disaster recovery of a database and information management cell consolidation. A replacement storage manager and restore agent can also be used in a system for accessing and reviewing archived non-production data of an obsolete or no-longer operating information management cell. There are many useful scenarios and applications for a system that accesses and reviews archived non-production data. In a first scenario, the jeans manufacturer may have acquired a small textile business having years of records stored in boxes of magnetic tapes. A system that accesses and reviews archived non-production data enables the jeans manufacturer to review the content of the magnetic tapes and quickly determine what type of content stored on the magnetic tapes, without reviewing all of the information stored on the magnetic tapes. In a second scenario, a court, attorney, bank, or trustee may have a need to review records from a company that is being liquidated after bankruptcy. The company may have lost its IT support and may only have records that are in a magnetic tape library or that are in boxes of magnetic tapes. Rather than restoring all of the data of all of the magnetic tapes, the court, attorney, or trustee may use the disclosed restore agent to identify the locations of email messages, accounting records, or other information associated with a particular date or time frame.

Figure 13:
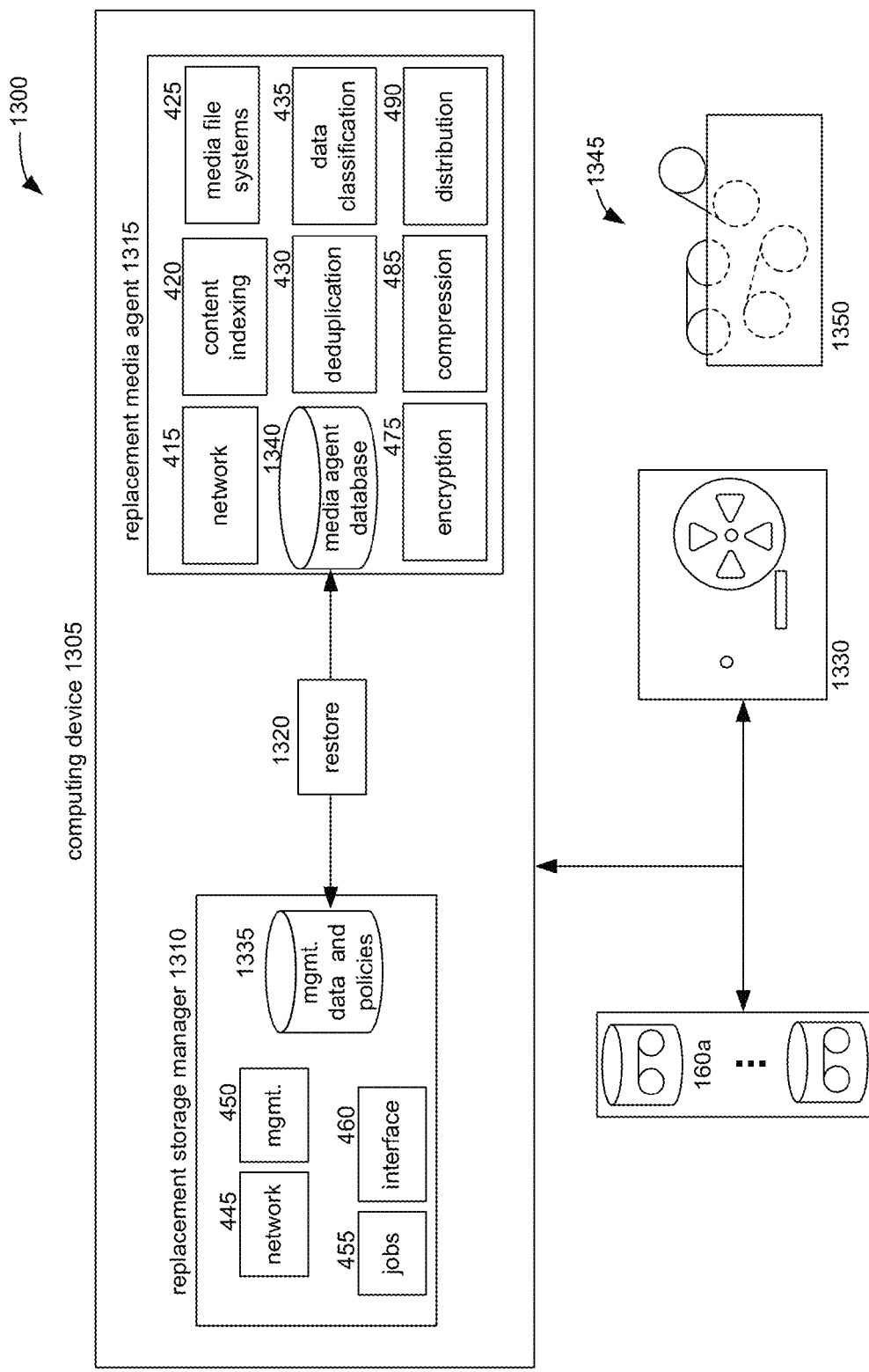
FIG. 13 is a block diagram illustrating an example of a system for analyzing storage media from an obsolete information management cell.

Referring to FIG. 13, a computing environment 1300 includes a computing device 1305 that builds one or more data structures, e.g., databases, from metadata stored on magnetic tapes to enable a user to perform a high-level review of the content of the magnetic tapes. The computing device 1305 includes a software installation of a replacement storage manager 1310, a replacement media agent 1315, and a restore agent 1320. The replacement storage manager 1310 includes many of the software agents of the previously described storage manager 402 (shown in FIG. 4). The replacement media agent 1315 includes many of the software modules of the previously described media agents 410 (shown in FIG. 4). The restore agent 1315 includes the software modules of the restore agent 515 (shown in FIG. 5). Once the computing device 1305 is connected to a magnetic tape library 1325 or a magnetic tape reader 1330, the restore agent 1320 coordinates with the software agents/modules of the replacement storage manager 1310 and/or the replacement media agent 1315.

The restore agent 1320 operates in a manner similar to the previously disclosed restore agents. Namely, the restore agent 1320 scans the magnetic tapes that are identified by a user for metadata that includes characteristics of the magnetic tapes and the non-production data stored on the magnetic tapes. The restore agent 1320, in response to selections made by the user, builds the database 1335 or the database 1340 using the information retrieved from the scans and enables the user to review the dates, type of content, sizes, and other information related to the non-production data stored on the magnetic tapes. The restore agent 1320 enables the user, via the computing device 1305, to restore very specific information from the magnetic tapes, by displaying the entries of the database 1335 or 1340 and by instructing the replacement media agent 1315 to restore selected database entries to memory in the computing device 1305. For example, using the computing device 1305, a user can inventory the magnetic tapes 1345 of the box of magnetic tapes 1350 and restore all email messages backed up on, for example, Mar. 19, 1999 for further review or analysis. In this way, the system in this implementation is able to employ a replacement storage manager and restore agent to access and review archived non-production data, from, e.g. an obsolete or no-longer operating information management cell.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessorbased or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. At least one tangible computer-readable medium storing instructions, which when executed by at least one data processing device, perform recreating an original information management database for an information management network, wherein the information management network does not have access to an acceptable secondary copy of the original information management database, the instructions comprising:

receiving, by an information management server, instructions associated with identifying non-production storage media via a user interface,
wherein the information management server provides information management services to client computing devices within the information management network, wherein the original information management database includes data identifying files stored by the information management server and client computing devices associated with those files;

wherein the non-production storage media contain secondary copies of application data generated by the client computing devices in the information management network; and wherein the instructions indicate whether the information management server performs an automated search of the information management network or a manual search of the information management network, wherein when the instructions indicate a manual search, the instructions further include one or more of a network address for at least one of the non-production storage media and an identifier of at least one of the non-production storage media;

identifying, with the information management server, non-production storage media within the information management network in accordance with the received instructions;

scanning, with the information management server, the identified non-production storage media for metadata associated with the secondary copies of the application data, wherein the metadata includes headers at the beginning of a file within at least one of the secondary copies of the application data, trailing file markers appended to the end of the file, or both headers and trailing file markers, and wherein the metadata includes-information regarding files recorded in the original information management database, and information regarding the client computing devices associated with each of the files;

retrieving the metadata from the non-production storage media, but not retrieving the secondary copies of the application data; and populating a reconstructed information management database with the retrieved metadata from the non-production storage media, wherein the reconstructed information management database is substantially similar to the original information management database.

2. The computer-readable medium of claim 1 wherein the information management network is a private network, wherein the client computing devices have private IP addresses so that computing devices that are not connected to the private network cannot access the client computing devices without logging into the private network, and wherein at least some of the client computing devices are associated with a storage management cell that is hierarchically subordinate to the information management server, and wherein the information management server is configured to control and access the original information management database and the reconstructed information management database.

3. The computer-readable medium of claim 1, further comprising:

providing a user interface, with the information management server, to enable a user to provide instructions associated with identifying the non-production storage media;

receiving, via the user interface, the instructions associated with identifying the non-production storage media, wherein the instructions indicate whether the information management server performs an automated search of the information management network or a manual search of the information management network, wherein when the instructions indicate a manual search, the instructions further include one or more of a network address for at least one of the non-production storage media and an identifier of at least one of the non-production storage media; and displaying at least some of the non-production storage media identified by the information management server, wherein displaying includes displaying a device ID for the at least some of the non-production storage media, wherein the user interface receives selections from the user of one or more of the displayed non-production storage media, and wherein scanning the identified non-production storage media includes scanning the selected ones of the displayed ones of the non-production storage media and not from non-production storage media not selected via the user interface.

4. The computer-readable medium of claim 1 further comprising:

displaying at least some of the non-production storage media identified by the information management server, wherein displaying includes displaying a device ID for the at least some of the non-production storage media, wherein a user interface receives selections from a user of one or more of the displayed ones of the non-production storage media, wherein scanning the identified non-production storage media includes scanning the selected ones of the displayed ones of the non-production storage media and not from non-production storage media that has not been selected via the user interface.

5. The computer-readable medium of claim 1 wherein the information management network is a first network that is a subnetwork of a second network, wherein the information management server is a first information management server that receives information management instructions associated with the client computing devices from a second information management server, wherein the first information management server created at least some of the secondary copies of application data on at least some of the identified non-production storage media.

6. The computer-readable medium of claim 1 wherein, for the ones of the non-production storage media that are magnetic tapes, scanning includes:

reading, into temporary memory of the information management server, portions of content on the non-production storage media; and, writing over the portions of the content in the temporary memory with additional portions of the content until metadata is found.

7. A method of, upon losing a master information management database, restoring or rebuilding the master information management database for an information management network, wherein the information management network does not include a secondary copy of the master information management database, in a single storage device, available for immediate use by an information management server, the method comprising:

identifying, with an information management server, all computing devices within the information management network,
  wherein the information management network is a hierarchical network;
  wherein the information management server directs intermediate information management servers to perform information management services for client computing devices within the information management network,
    wherein information management services include:
      creating secondary copies of application data stored by the client computing devices, and
      restoring the secondary copies of the application data to the client computing devices, and,
    wherein identifying the computing devices includes receiving a network address for each of the computing devices;
identifying the ones of the computing devices that are intermediate information management servers,
  wherein identifying the intermediate information management servers includes automatically identifying the intermediate information management severs or manually identifying the intermediate information management servers;
requesting a copy of an intermediate information management database from each intermediate information management server,
  wherein the intermediate information management databases include records for mapping non-production storage media to secondary copies of application data for client computing devices,
    wherein each intermediate information management database includes some records, but not all records associated with all the client computing devices, and
    wherein the intermediate information management databases cumulatively include all records associated with all the client computing devices;
receiving copies of the intermediate information management databases from the intermediate information management servers; and
populating the master information management database with information from the received intermediate information management databases.

8. The method of claim 7 wherein automatically identifying the intermediate information management servers includes:
  requesting identifying names from the computing devices using the received network addresses, and
  selecting the intermediate information management servers from all of the computing devices based on the names of the computing devices.

9. The method of claim 7 wherein manually identifying the intermediate information management servers includes:
  providing a user interface; and
  receiving, from a user via the user interface, selections of the intermediate information management servers from all the computing devices.

10. The method of claim 7 wherein each of the records includes:
  a time at which one of the secondary copies of application data was created;
  an identifier of which one of the client computer devices the one of the secondary copies of application data corresponds to; and
  an identifier of a secondary copy format used to create the one of the secondary copies of application data.

11. A method of consolidating multiple information management computing devices into a single information management computing device without disrupting information management operations within an information management system, the method comprising:
  identifying, with the single information management computing device, the multiple information management computing devices,
    wherein the identifying includes receiving a network address for each of the information management computing devices, and
    wherein the identifying includes automatically identifying the information management computing devices or manually identifying the information management computing devices;
  requesting, with the single information management computing device, copies of information management databases from each of the multiple information management computing devices,
    wherein the copies of information management databases include records for mapping non-production storage media to secondary copies of application data for client computing devices,
    wherein the copies cumulatively include all records associated with all the client computing devices;
  receiving, with the single information management computing device, the requested copies of the information management database from each of the multiple information management computing devices;
  merging, with the single information management computing device, the copies of the information management databases into a master information management database stored on the single information management computing device; and
  initiating communications with client computing devices that were managed by each of the multiple information management computing devices regarding information management operations performed by the multiple information management computing devices and to enable a user to take each of the multiple information management computing devices offline without disrupting the information management services,
    wherein the information management operations include:
      creating secondary copies of application data stored by client computing devices, and
      restoring the secondary copies of the application data to client computing device.

12. The method of claim 11, wherein identifying the multiple information management computing devices includes automatically identifying the multiple information management computing devices or manually identifying the multiple information management computing devices,
  wherein manually identifying the multiple information management computing devices includes:
    providing a user interface;
    identifying all computing devices on a private network;
    displaying a list of the computing devices for a user to select from; and
    receiving selections from the list of the computing devices by the user.

13. The method of claim 11 wherein, prior to being taken offline, each of the multiple information management computing devices regulates the information management operations of a corresponding information management cell, wherein each corresponding information management cell includes intermediate information management servers and client computing devices that store or generate production data, wherein each intermediate management server:
creates secondary copies of production data for ones of the client computing devices that are within the information management cell of the intermediate information management computing device;
selectively restores the secondary copies of production data for the ones of the client computing devices that are within the information management cell of the intermediate information management computing device; and
migrates the secondary copies from a first set of non-production storage devices to a second set of non-production storage devices.

14. A system for selectively recreating an original information management database for an information management network from data that is stored on magnetic tapes, the system comprising:
at least one processor;
at least one data storage device;
means for receiving instructions associated with identifying magnetic tapes via a user interface,
wherein the original information management database includes data identifying files stored by the system and client computing devices associated with those files;
wherein the magnetic tapes contain secondary copies of application data generated by the client computing devices in the information management network; and
wherein the instructions indicate whether the system performs an automated search of the information management network, or a manual search of the information management network with instructions having a network address and an identifier of at least one of the magnetic tapes,
means for establishing a connection between a computing device and a magnetic tape reader;
means for scanning, with the computing device, magnetic tapes via the magnetic tape reader for metadata associated with secondary copies of application data stored on the magnetic tapes,
wherein the metadata includes file markers appended to a file of the secondary copies of the application data, and
wherein the metadata includes information regarding the client computing devices associated with each of the files;
wherein the file markers identify a secondary copy format used in storing the secondary copies of the application data generated by the client computing devices,
wherein the file markers identify the type of information included within the secondary copies of the application data,
wherein the file markers identify the size of the secondary copies of the application data,
wherein the file markers identify start and stop locations on the magnetic tapes for the secondary copies of the application data, and
wherein the file markers identify the magnetic tapes, and
wherein the means for scanning includes:
means for reading, into temporary memory of the information management server, portions of content on the non-production storage media; and,
means for writing over the portions of the content in the temporary memory with additional portions of the content until metadata is found;
means for retrieving the scanned metadata and not the secondary copies of the application data from the non-production storage media;
means for populating a database with the retrieved metadata from the non-production storage media;
means for displaying at least a portion of the database in a user interface to enable a user to select one or more entries of the database; and
means for restoring portions of the secondary copies of the application data to the computing device in response to a selection of the one or more entries of the database by the user.

15. The system of claim 14, further comprising:
a restore agent; and
a media agent that includes a database that maps non-production data on non-production storage media to client computing devices that are directly managed by the media agent,
wherein when the database of the media agent is damaged or rendered unusable, the restore agent restores the database of the media agent by retrieving content from non-production storage media or by requesting from a storage manager those portions of a storage manager database that are associated with the media agent.

16. The system of claim 14 wherein the metadata includes headers at the beginning of each of the magnetic tapes, wherein the headers identify the magnetic tapes, and wherein the metadata includes file trailers that identify a secondary copy format used in storing the secondary copies of the application data, identify the type of information included within the secondary copies of the application data, identify the size of the secondary copies of the application data, and identify the start and stop locations on the magnetic tapes for the secondary copies of the application data.

* * * * *

UNITED STATES PATENT AND TRADEMARK OFFICE
CERTIFICATE OF CORRECTION

| | | |
|---|---|---|
| PATENT NO. | : 9,069,799 B2 | Page 1 of 1 |
| APPLICATION NO. | : 13/727981 | |
| DATED | : June 30, 2015 | |
| INVENTOR(S) | : Manoj Kumar Vijayan | |

It is certified that error appears in the above-identified patent and that said Letters Patent is hereby corrected as shown below:

In the claims

In column 29, lines 32-33, in Claim 1, delete "includes-information" and insert -- includes information --, therefor.

Signed and Sealed this
First Day of December, 2015

Michelle K. Lee
*Director of the United States Patent and Trademark Office*